United States Patent Office 3,262,938
Patented July 26, 1966

3,262,938
CARBOCYCLIC SUBSTITUTED PIPERIDYL
DIOXOLANES
Waldo Richard Hardie, Walnut Creek, and Isaac Frederick Halverstadt, Berkeley, Calif., assignors to Cutter Laboratories, Inc., Berkeley, Calif., a corporation of Delaware
No Drawing. Filed Nov. 19, 1964, Ser. No. 412,335
22 Claims. (Cl. 260—294.7)

This invention relates to compositions of matter classified in the art of chemistry as substituted dioxolanes and to processes for making and using such compositions.

This application is a continuation-in-part of application S.N. 88,285, filed February 10, 1961, now abandoned, and application S.N. 115,309, filed June 7, 1961, now abandoned.

The invention sought to be patented, in its composition of matter aspect, is described as residing in the concept of a chemical compound having the 4-piperidyl-1,3-dioxolane structure, in which structure the piperidine ring is attached by a ring carbon atom thereof directly to the 4-position carbon atom of the dioxolane ring, in molecular chemical combination by carbon-to-carbon linkage to the 2-position carbon atom of the dioxolane ring, with a neutral cyclic structure, containing up to 3 rings including a carbocyclic ring in the carbon-to-carbon linkage with the 2-position carbon atom of the dioxolane ring.

The tangible embodiments of this invention, in their free base, acid addition and quaternary ammonium forms, are novel chemical compounds whose utility includes the inherent applied use characteristic of exhibiting pharmacological activity, including anti-spasmodic activity, as evidenced by pharmacological evaluation according to standard test procedures.

The novel structural feature of all the tangible embodiments of this invention is the molecular chemical combination of the 4-piperidyl-1,3-dioxolane structure with a carbocyclic ring-containing neutral, i.e., essentially non-basic and non-acidic, cyclic structure at the 2-position of the dioxolane ringe. The novel chemical compounds, resulting from this chemical combination of a neutral cyclic structure with the basic piperidyl dioxolane structure, are useful in scientific research particularly in the field of pharmacology because of their pharmacological activity. These tangible embodiments possess the inherent applied use of modifying body functions in laboratory test animals, especially those influenced by the autonomic system and nerve impulses transmitting pain stimulus to the brain. In all of the representative compounds made and tested, the former activity manifested itself as papavarine-like anti-spasmodic activity. In many, the activity on nerve impulses transmitting pain stimuli manifested itself as local anesthesia and/or analgesia. As in all classes of chemical compounds, the manifestation of pharmacological activity varies in degree and character from member to member in this novel class of compounds. Thus, other pharmacological activities possessed by members of the group of compounds of this invention include anti-inflammatory, diuretic, mineralocorticoid antagonist, anti-convulsant, hypnotic, anti-anxiety, CNS stimulant and depressant activity, anti-ulcer and anti-Parkinson activity as a result of anti-cholinergic and anti-tremorine activity, anti-arrhythmic including anti-fibrillatory activity.

Structurally, the piperidine ring of the compounds of this invention can be attached to the dioxolane ring by the 2-, 3- or 4-position carbon atom of the piperidine ring. Those compounds in which the piperidine ring is attached by the 2-position carbon atom have, as a class, greater pharmacological activity and thus are preferred. However, those attached by the 4-position carbon atom are of interest as a result of their anti-lipase activity. This attachment is direct, i.e., a ring carbon atom of the piperidine ring is bonded directly to the 4-position carbon atom of the dioxolane ring.

The neutral cyclic structure at the 2-position carbon atom of the dioxolane ring contains at least one carbocyclic ring, which ring is in the carbon-to-carbon linkage with the 2-position carbon atom of the dioxolane ring. The carbocyclic ring can be cycloalkyl, aryl, or spiroalkyl in which the 2-position carbon atom of the dioxolane ring is also a ring carbon atom of the carbocyclic ring. Examples of cycloalkyl rings are cyclopropyl, cyclopentyl, cyclohexyl, cycloheptyl, 1,4-methylenecyclohexyl, cyclopentenyl, cyclohexenyl, cyclopentadienyl, cyclohexadienyl, decahydronaphthyl, octahydronaphthyl, perhydroanthryl and perhydrophenanthryl. Of these, cyclohexyl is preferred. Examples of aryl rings are phenyl, biphenylyl, p-benzylphenyl, naphthyl, fluorenyl and phenanthryl. Of these, those in which the aryl group is a benzene ring are preferred. Examples of spiroalkyl rings are those in which the 2-position carbon atom of the dioxolane ring is also part of a cyclopentyl, cyclohexyl, cycloheptyl or 9-fluorenyl ring.

The cycloalkyl or aryl ring described above can be attached directly to the 2-position ring carbon atom of the dioxolane ring or separated by a carbon chain containing 1–8 carbon atoms in the chain preferably no more than one carbon atom. Examples of such cyclic systems in which the carbocyclic ring is separated by a carbon chain are aralkyl, e.g., benzyl, diphenylmethyl, triphenylmethyl, phenethyl, α-phenylethyl, α-phenylpropyl and α-cyclopentyl-benzyl, cycloalkylalkyl, e.g., cyclohexylmethyl and dicyclohexyl-methyl. Of this class, preferred are benzyl and diphenylmethyl. The cyclic structure can be a combination of cycloalkyl and aryl, e.g., indanyl and tetrahydronaphthyl attached by either the benzene or cycloalkyl ring.

Of the above-described cyclic structures, the aryl are preferred over cycloalkyl and spiroalkyl. Especially preferred are aryl containing 1–3, preferably 1–2, benzene rings separated by no more than one carbon atom from the 2-position carbon atom of the dioxolane ring, e.g., phenyl, benzyl, diphenylmethyl and triphenylmethyl.

When the cyclic structure described above is aryl or cycloalkyl, i.e., one which satisfies only one valence of the 2-position carbon atom of the dioxolane ring, the remaining valence can be satisfied by a hydrogen atom, or an essentially neutral alkyl group, e.g., a lower-alkyl group, including substituted lower-alkyl, e.g., hydroxy-lower-alkyl, halo-lower-alkyl, lower-alkoxy-lower-alkyl and lower-acyloxy-lower-alkyl, a second neutral carbocyclic cyclic structure as defined above, or a neutral, i.e., essentially non-acidic and non-basic, heterocyclic structure, preferably in which the hetero atom or atoms are oxygen or sulfur, e.g., furyl, tetrahydrofuryl, pyranyl, tetrahydropyranyl, dioxanyl, thienyl, benzofuryl, etc., attached by a ring carbon atom. Preferably such a heterocyclic structure contains no more than 2 and more preferably only one heteroatom. In the most active and thus preferred compounds, the second valence of the 2-position carbon atom is satisfied by a second neutral cycloalkyl or aryl structure as defined above, most preferably aryl. Examples of such compounds are 2,2-diphenyl-, 2,2-dicyclohexyl-, 2,2-dibenzyl-, 2-phenyl-2-benzyl-, and 2-phenyl-2-diphenylmethyl-4-(2-piperidyl)-1,3-dioxolane.

The cyclic structure at the 2-position of the dioxolane ring, including substituents thereon preferably has a molecular weight between 70 and 300, more preferably less than 250. When the 2-position carbon atom bears a lower-alkyl, substituted lower-alkyl, or second cyclic structure, in addition to the cyclic structure described above, its molecular weight is included in this preferred molecular weight upper limit. The term "lower,"

e.g., when used in "lower-alkyl," means containing up to eight carbon atoms.

Because novelty and utility of the compounds are the result of the molecular chemical combination of the piperidyl-1,3-dioxolane structure in combination with the carbocyclic ring-comprising structure at the 2-position carbon atom, embraced within the scope of the compounds having this structural combination are those having one or more, usually not more than a total of four and preferably not more than three, simple substituents on the piperidine and carbocyclic rings. Those which can be on a carbon atom thereof include halo, e.g., chloro, bromo and fluoro, lower-alkyl including methyl, ethyl, propyl and octyl, trifluoromethyl, trichloromethyl, lower-alkoxy including methoxy and ethoxy, aryloxy and aralkoxy including benzyloxy and phenoxy, lower-acyloxy including acetoxy, propoxy and benzoxy, carbo-lower-alkoxy including carbethoxy and carbomethoxy, nitro, and acetamido. The nitrogen atom of the piperidine ring can bear a hydrogen atom so that the resulting piperidyl-1,3-dioxolane is a secondary amine, or can be substituted to provide a tertiary amine, e.g., with lower-alkenyl including allyl, aryl including phenyl, aralkyl including benzyl and phenethyl, alkaryl including tolyl, lower-alkyl including methyl, ethyl, propyl, butyl, octyl, hydroxy alkyl, e.g., hydroxyethyl, hydroxyalkyleneoxyalkyl, e.g., hydroxethyleneoxyethyl, acyloxyalkyl, e.g., acetoxyethyl, acetoxypropyl, propionyloxyethyl, aminoalkyl, e.g., aminoethyl, methylaminoethyl, dimethylaminoethyl, diethylaminoethyl, pyrrolidinoethyl, piperidinoethyl, morpholinoethyl and the corresponding γ and ω-amino-substituted propyl, butyl, etc. These N-substituted piperidyl dioxolanes can be further alkylated, e.g., with methyl iodide, ethyl bromide, benzyl chloride, to provide the quaternary ammonium compounds of this invention or oxidized with, e.g., hydrogen peroxide or an organic peroxide, to produce the corresponding N-oxides which also possess the useful pharmacological activity referred to hereinbefore. Preferably, so that the activity of the compounds is predominantly that resulting from the novel combination of the 4-piperidyl-1,3-dioxolane structure and a cyclic structure at the 2-position, the sum of the molecular weight of these substituents is less than the sum of the molecular weights of the unsubstituted piperidine, dioxolane and 2-position cyclic ring systems, e.g., less than 200 and more preferably less than 150, so that the resulting compound has a total molecular weight of less than 500, preferably less than 400, in free base form.

Preferred sub-classes of compounds within this invention are the piperidyl-2-carbocyclic substituted-1,3-dioxolanes meeting one or more of the following requirements: (a) other than the 2-position carbon atom of the dioxolane ring, the ring carbon atoms of the 4-piperidyl-1,3-dioxolane structure are unsubstituted; (b) other than the piperidine ring nitrogen atom and the dioxolane ring oxygen atoms, the 4-piperidyl-1,3-dioxolane structure is hydrocarbon; (c) the 1-position piperidine substituent is hydrogen, hydrocarbon of 1–12 carbon atoms, preferably 1–8 carbon atoms, e.g., alkyl or aralkyl as described above, or amino-substituted alkyl, preferably tertiary amino substituted-lower-alkyl as described above; (d) both valences of the 2-position dioxolane carbon atom are satisfied by a cyclic structure as defined herein; (e) the piperidine ring is attached by the 2-position carbon atom thereof to the dioxolane ring; (f) the cyclic structure contains at least one benzene ring and more preferably contains only benzene rings, separated by no more than one carbon atom from the 2-position carbon atom of the dioxolane ring; (g) the cyclic structure is hydrocarbon, preferably of a molecular weight less than 200; (h) the cyclic structure is phenyl; (i) the compounds are in their acid addition salt form, preferably as their hydrochloride; (j) the alpha racemate is isolated substantially free from the beta racemate, either as a mixture of its optical isomers or in the form of either of its optical isomers substantially free from the other isomer.

One preferred sub-class of compounds of this invention are those of a molecular weight less than 400 represented by the formula

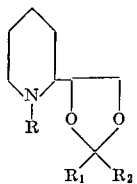

wherein R is hydrogen, hydrocarbon of 1–8 carbon atoms, including alkyl, alkenyl, aryl and aralkyl, lower-alkanoyl, $R_3R_4$N-lower-alkyl or $R_3R_4$N-lower-alkanoyl, wherein $R_3$ and $R_4$ are H, lower-alkyl or collectively with the nitrogen atom pyrrolidino, piperidino or morpholino, hydroxy-lower-alkyl or hydrocarbon-lower-acyloxy-lower-alkyl, $R_1$ is phenyl, benzyl or diphenylmethyl in which the substituents other than hydrogen are up to two of halo, trifluoromethyl, lower-alkyl, lower-alkoxy, lower-acyloxy, carbo-lower-alkoxy, nitro, or acetamido and $R_2$ is hydrogen, lower-alkyl or $R_1$, most preferably $R_1$.

Within this preferred sub-class of compounds the most preferred are those of the above formula wherein R is hydrogen or hydrocarbon of 1–8 carbon atoms, $R_1$ is phenyl, benzyl or diphenylmethyl, and $R_2$ is hydrogen, lower-alkyl or $R_1$. Of these especially preferred are those in which R is H.

The manner of making and using the invention will now be generally described so as to enable a person skilled in the art to make and use the same, as follows:

The dioxolanes of this invention can be prepared by the general method of condensing the appropriate ketone, aldehyde or acetal with a piperidyl vicinal glycol in the presence of an acid catalyst. The starting acetals can be prepared by several methods. One method, Method A, described by Lorette and Howard, J. Org. Chem., 25, 521 (1960), involves an exchange reaction using the ketone whose acetal is desired and 2,2-dimethoxypropane. This method was used with several aliphatic and mixed ketones and with benzophenone, whose acetal can also be prepared by reaction with dimethyl sulfite. Another method described by W. Schlenk and E. Bergmann, Ann. Chem., 463, 98 (1928), Method B, shown below, was used to prepare substituted aromatic ketones 4,4′-dimethoxybenzophenone, phenyl 2-thienyl ketone, and 9-fluorenone.

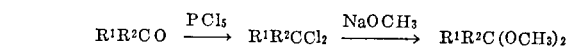

$R^1$ and $R^2$ comprise a cyclic structure as described above. A further method, involving the preparation of the corresponding 4-(4-pyridyl)-1,3-dioxolane which is then hydrogenated to produce the corresponding 4-(4-piperidyl)-1,3-dioxolane.

The starting piperidyl vicinal glycol can be prepared by hydrogenating the corresponding (2-pyridyl)-1,2-ethanediol hydrochloride in water, acetic acid or methanol using platinum oxide catalyst. Rhodium-on-carbon is also a suitable catalyst.

The compounds of this invention and their preparation are illustrated by the formulae showing the preparation of 2,2-diphenyl-4-(2-piperidyl)-1,3-dioxolane:

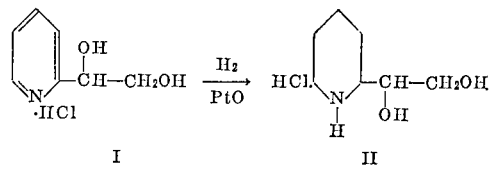

I          II

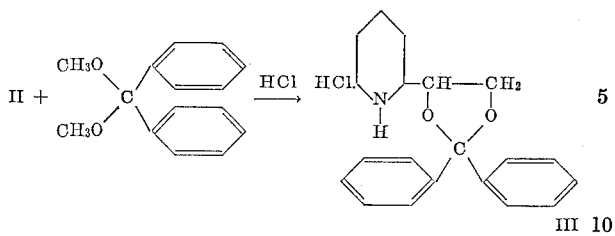

The starting piperidine glycols have two asymmetric centers and are thus capable of existing as two racemic mixtures and four stereoisomers. The above described hydrogenation gives a mixture of the two possible racemates, i.e., a lower melting alpha and a higher melting beta form. Use of this mixture of racemates as the reactant produces a mixture of two or more dioxolane racemic modifications which can then be separated by solvent recrystallization. The use of the separated alpha or beta racemate of the starting glycol as the reactant leads to the corresponding alpha or beta racemate form of the dioxolane thus produced, substantially free from the other racemate form. The higher melting ($\beta$) racemate hydrochloride can be separated from the hydrogenation product by fractional crystallization from isopropanol or other selective solvent. A more practical separation, which gives pure samples of each racemate, is to condense the mixture of piperidyl-glycols with the methylal of benzophenone. The resulting dioxolane racemates are then separated and thereafter hydrolyzed to give the pure racemates of the starting glycol.

A preferred aspect of the invention is the pure optical isomers of the pure racemates, substantially free from the other optical isomer. Resolution of the pure racemates into their pure optical isomers is accomplished by forming an acid addition salt of the free base form with an optically active organic acid, e.g., tartaric acid, in a solvent, e.g., methanol or other lower-alkanol. After separation and purification, the acid addition salt can then be converted back to the free base form and then to an optically pure salt of the desired acid, e.g., the hydrochloride.

In the preferred preparative approach for making the dioxolane compositions of this invention, a piperidyl ethylene glycol is caused to undergo an alcohol exchange reaction with the appropriate acetal using a strong acid catalyst, most conveniently hydrogen chloride. A solvent having a slightly higher boiling point than the alcohol used to form the acetal is desirable. Isopropanol is a particular suitable solvent for the reaction. The precise proportions of reactants, the presence or absence of a solvent, and the reaction time and temperature employed are not critical. A very slight excess of hydrogen chloride in the reaction mixture initiates the reaction. The condensation proceeds satisfactorily when either the mixture of racemates or one of the pure racemates is used. When a pure racemate of the glycol is used, its racemate assignment is also given to the dioxolane product.

The alpha racemate of 2,2-diphenyl-4-(2-piperidyl)-1,3-dioxolane, its optical enantiomers and the corresponding beta racemate were the starting materials for the preparation of the N-substituted piperidine compounds shown in the examples. The method of W. E. Weaver and W. M. Whaley, J. Am. Chem. Soc., 69, 516 (1947), when used for preparing the N-acyl derivatives, gave better yields when the amount of acyl chloride was increased to two moles per mole of amine. N-acyl compounds were reduced with lithium aluminum hydride to give the corresponding N-alkyl derivatives. N-methyl-dioxolanes were prepared by catalytic hydrogenation in the presence of formaldehyde, following the procedure of R. E. Bowman and H. H. Stroud, J. Chem. Soc., 1342 (1950).

For all compounds shown in the examples, procedures described for the preparation of dioxolanes of one racemate are also illustrative of the preparation of the other racemate of the same structure.

From the manner in which the compounds of this invention are prepared, the nature of the 2-position substituents in the dioxolane ring is determined by the choice of reactant aldehyde, ketone or acetal. For example, methyl cyclohexyl ketone yields a compound in which the valences of the 2-position carbon atom are satisfied by a carbocyclic group (cyclohexyl) and an alkyl group (methyl); dibenzyl ketone yields a compound in which the valences are satisfied by two separate carbocyclic groups (benzyl), and cyclohexanone yields a compound in which the valences are satisfied by the 2-position carbon atom being itself part of the 2-position carbocycle (spiroalkane).

The compounds of this invention can exist in their free base, acid addition and quaternary ammonium salt forms. The acid-addition salt form of the compounds of this invention can be prepared in the conventional manner by reacting the free base form of the compounds of this invention with an inorganic acid, for example, hydrochloric, hydrobromic, hydiodic, sulfuric, and phosphoric, or an organic acid, for example, acetic, hydroxyacetic, lactic, tartaric, glycolic, citric, tannic, commonly used for this purpose. These salts are convenient forms for the isolation and purification of the compounds of this invention and for the administration of the compounds for the pharmacological purposes set forth herein. In these and other respects the acid addition salt form of the compounds of this invention is the equivalent of the free base form.

The quaternary ammonium salt form of the compounds of this invention can be prepared in the known manner by reacting the free base form of a tertiary amine of this invention with an alkyl halide, for example, methyl bromide, ethyl chloride, propyl iodide, benzyl chloride, etc. The anions of the various salts can be exchanged for different anions, where desired, by conventional tehcniques, e.g., with ion exchange resins.

The foregoing discussion is offered to illustrate methods suitable for the practice of our invention and not to limit its scope. The invention is further illustrated by the following examples. (All temperatures are reported in degrees centigrade.)

PREPARATIONS 1–11

The following acetals were prepared using Method A for Preparations 1–6 and Method B for Preparations 7–11:

TABLE I.—$R_1R_2C(OR)_2$

| Prep. No. | $R^1$ | $R^2$ | R | M.P. or B.P., °C. | $n_D{}^{25}$ |
|---|---|---|---|---|---|
| 1 | $CH_3$ | $C_6H_5$ | $C_3H_7$ | 75/3 mm | 1.4747 |
| 2 | $C_2H_5$ | $C_6H_5$ | $C_3H_7$ | 89–90/3 mm | 1.4767 |
| 3 | $C_6H_5CH_2$ | $C_6H_5CH_2$ | $C_3H_7$ | 147–154/3 mm | 1.5623 |
| 4 | $C_6H_5$ | $C_6H_5$ | $CH_3$ | 107–108 (corr.) | |
| 5 | $CH_3$ | $(C_6H_5)_2CH$ | $C_3H_7$ | 132–135/1 mm | 1.5620 |
| 6 | $C_6H_5$ | $C_6H_5CH_2$ | $C_3H_7$ | 144–146/3 mm | |
| 7 | 4-$CH_3OC_6H_4$ | 4-$CH_3OC_6H_4$ | $C_3H_7$ | 170–172/1 mm | 1.5302 |
| 8 | 2-thienyl | $C_6H_5$ | $CH_3$ | 56–59 [a] | |
| 9 | $C_6H_5$ | 4-$ClC_6H_4$ | $CH_3$ | 128/1 mm | 1.5667 |
| 10 | 4-$ClC_6H_4$ | 4-$ClC_6H_4$ | $CH_3$ | 68.5–70 | |
| 11 | Fluoren-9-ylidene | | $CH_3$ | 86–87.5 [b] | |

[a] Recrystallized from isopropanol.
[b] Recrystallized from benzene.

PREPARATION 12.—2-piperidyl-1,2-ethanediol hydrochloride 2-piperidyl-1,2-ethanediol hydrochloride was prepared by hydrogenation of 116 grams of 2-pyridyl-1,2-ethanediol hydrochloride dissolved in 60 milliliters of water using 2 grams of platinum oxide as catalyst. The theoretical amount of hydrogen was absorbed after a reaction period of 30 hours at 60 p.s.i. The catalyst was removed and the solution was evaporated to a heavy sirup at reduced pressure on the steam bath. A dilution of the sirup with an equal volume of isopropanol followed by re-evaporation to the sirupy residue was repeated three times, leaving a residue of 2-piperidyl-1,2-ethanediol hydrochloride as a mixture of two racemates.

PREPARATION 13.—2-piperidyl-1,2-ethanediol-separation of the alpha and beta racemates Twenty-one grams (0.116 mole) of crude 2-piperidyl-1,2-ethanediol hydrochloride from the mixture of racemates (Preparation 12) was dissolved in 100 milliliters of ethanol and treated with a solution of 6.25 grams (0.116 mole) of sodium methoxide in 25 milliliters of methanol. After removing the precipitated sodium chloride the solvent was removed under vacuum and the oily free base was dissolved in 120 milliliters of warm ether. After standing at room temperature for about a day, 2.2 grams of crystals were obtained, melting at 99–101 degrees. These were the beta-racemate of 2-piperidyl-1,2-ethanediol. The mother liquor was concentrated to about 80 milliliters. After standing at room temperature for two days, rhombic crystals were formed weighing 7 grams and melting at 76–78 degrees. These were ground to a powder and redissolved in about 300 milliliters of ether. Three crops of crystals were obtained by reducing the volume of the mother liquor after each collection. These totalled 4.1 grams, melting at 77–78° and were the alpha-racemate of 2-piperidyl-1,2-ethanediol.

PREPARATION 14.—2-piperidyl-1,2-ethanediol hydrochloride, alpha racemate

A mixture of 221.8 grams (0.64 mole) of the alpha-racemate of 2,2 - diphenyl-4-(2-piperidyl)-1,3-dioxolane hydrochloride (from Example 5) in one liter of methanol containing 10 milliliters of concentrated hydrochloric acid and 50 milliliters of water was refluxed for 2.5 hours. The solvent was removed under vacuum, the oily residue was triturated with two 250 milliliter portions of ether, the ether washes were discarded and the residue dissolved in 400 milliters of n-butanol. The butanol was removed by distillation to remove last traces of water and excess hydrochloric acid. The residue crystallized and was washed with dry ether to give 115.3 grams of 2-piperidyl-1,2-ethanediol hydrochloride, alpha-racemate, melting at 100–101°.

PREPARATION 15.—2-piperidyl-1,2-ethanediol hydrochloride, beta racemate

Following the procedure of Preparation 14, 450 grams of the beta-racemate of 2,2-diphenyl-4-(2-piperidyl)-1,3-dioxolane hydrochloride (from Example 5) was decomposed to give 210 grams of the beta-racemate of 2-piperidyl-1,2-ethanediol hydrochloride, melting at 139–141°.

*Example 1.—2,2-diphenyl-4-(2-piperidyl)-1,3-dioxolane hydrochloride (Method A)*

A mixture of 86 grams of 2-piperidyl-1,2-ethanediol hydrochloride, 103 grams of dimethoxydiphenylmethane and 20 milliliters of isopropyl alcohol was heated in an oil bath at 130° while stirring the reaction mixture. Dry hydrogen chloride was admitted below the surface of the liquid until the mixture was strongly acidic. Almost immediately a cake formed which was broken up. The heating was continued so as to give slow distillation of the solvent which was replenished as needed during a period of about 8 hours. All solvent was then removed at reduced pressure. The reaction product was extracted with ether and the residue was first crystallized from ethanol then recrystallized from methanol by diluting with 3 volumes of ether to give 54.5 grams of 2,2-diphenyl-4-(2-piperidyl)-1,3-dioxolane hydrochloride melting at 248–252°.

*Analysis.*—Calculated for $C_{20}H_{23}NO_2 \cdot HCl$: C, 69.45; H, 6.99; N, 4.05. Found: C, 69.92; H, 6.92; N, 4.18.

*Example 2.—2,2-diphenyl-4-(2-piperidyl)-1,3-dioxolane hydrochloride (Method B)*

Two liters of isopropanol and 1436 grams (7.9 moles) of the mixed racemates of (2-piperidyl)-1,2-ethanediol hydrochloride were heated and stirred in a 5 liter flask equipped with a thermometer. When the temperature reached 80°, 2012 grams (8.8 moles) of dimethoxy-diphenylmethane was added, followed by one gram of dry hydrogen chloride in a few milliliters of isopropanol. A rapid reaction ensued with evolution of methanol vapors and the development of a heavy precipitate. After a few minutes methanol evolution subsided and the mixture was then heated and stirred for 2 hours and filtered warm on a suction funnel. The filter cake was washed successively with 2 liter portions of solvent, four times with ether and three times with isopropanol, to give 2042 grams (75 percent) of crude product, M.P. 234–238°. This is a mixture of two racemates, approximately in the ratio of 60 percent of the alpha ($\alpha$) and 40 percent of the beta ($\beta$) racemate of 2,2-diphenyl-4-(2-piperidyl)-1,3-dioxolane hydrochloride.

*Example 3.—2,2-diphenyl-4-(2-piperidyl)-1,3-dioxolane hydrochloride, alpha-racemate*

Following the procedure of Example 1 to the point where the reaction product was washed with ethyl ether gave a mixture of the racemates of 2,2-diphenyl-4-(2-piperidyl)-1,3-dioxolane hydrochloride. When this mixture was extracted with 370 milliliters of hot ethanol and filtered there was obtained a solution and a residue melting at about 300°. The solution was chilled to give a crystalline precipitate which was recrystallized from methanol until its composition appeared to be that of a pure racemate judged by melting point (256–260°) and by infrared absorption. The absorption spectrum of a crystalline sample in a potassium bromide pellet was characterized by low absorption in two areas, 745 cm.$^{-1}$ and 1270–1310 cm.$^{-1}$. This pure material was designated alpha-racemate.

*Analysis.*—Calculated for $C_{20}H_{23}NO_2 \cdot HCl$: C, 69.45; H, 6.99; N, 4.05. Found: C, 69.52; H, 7.17; N, 4.05.

This compound is a spasmolytic, local anesthetic, central nervous system depressant, an anti-convulsant, and is a parasympathetic blocking agent.

*Example 4.—2,2-diphenyl-4-(2-piperidyl)-1,3-dioxolane hydrochloride, beta-racemate*

The ethanol insoluble material melting at 300° described in Example 3 was recrystallized from methanol until its composition appeared to be that of a pure racemate as judged by melting point (301°) and by infrared absorption. The absorption spectrum of a crystalline sample in a potassium bromide pellet was distinguished by high absorption in two areas, 745 cm.$^{-1}$ and 1270–1310 cm.$^{-1}$ and by close conformity with the absorption spectrum of Example 3 throughout the remainder of the spectrum from 625 cm.$^{-1}$ to 4000 cm.$^{-1}$. This high melting material was designated beta-racemate.

*Analysis.*—Calculated for $C_{20}H_{23}NO_2 \cdot HCl$: C, 69.45; H, 6.99; N, 4.05. Found: C, 69.15; H, 6.85; N, 3.85.

This compound is a spasmolytic, local anesthetic and anti-convulsant.

*Example 5.—2,2 - diphenyl - 4-(2-piperidyl)1,3-dioxolane DL-tartrate and hydrochloride, alpha- and beta-racemate*

A suspension of 5.0 grams (0.0145 mole) of a mixture of racemates (containing approximately 15 to 20 percent of the beta-racemate and 80 to 85 percent of the alpha-racemate) of 2,2-diphenyl-4-(2-piperidyl)-1,3-dioxolane hydrochloride in 50 milliliters of 10 percent aqueous potassium hydroxide was extracted with three 75-milliliter portions of ether. After drying the ether extracts over anhydrous magnesium sulfate, the ether was removed to leave 4.5 grams of the oily free base. A solution of this base in 17 milliliters of methanol was treated with a solution of 1.35 grams (0.008 mole) of DL-tartaric acid monohydrate in 17 milliliters of methanol. After standing at room temperature for three hours, the crystalline mass was collected and washed with 10 milliliters of methanol. The 4.25 grams of 2,2-diphenyl-4-(2-piperidyl)-1,3-dioxolane DL-tartrate, melting at 233–235°, represented a 76 percent conversion from the hydrochloride salt to the DL-tartrate salt. The infrared curve (KBr plate) was identical to the curves for either dextro or levorotatory 2,2-diphenyl-4-(2-piperidyl) - 1,3 - dioxolane tartrate obtained in Examples 7 and 8.

An 840 gram (2.43 moles) portion of crude 2,2-diphenyl-4-(2-piperidyl)-1,3-dioxolane hydrochloride from Example 2 was dissolved in 8.4 liters of absolute ethanol and 2.5 liters of methanol at reflux and the solution allowed to stand for three days at 25° when it was decanted from approximately 170 grams of crystals. A saturated solution of the crystals (8 percent w./v.) in hot methanol gave a 50 percent recovery of pure β-racemate, M.P. 301°.

The mother liquor from the crystallization of crude β-racemate was evaporated to a dry powder and 660 grams (1.91 moles) was suspended in 800 milliliters of 10 percent aqueous sodium hydroxide. The suspension was vigorously stirred with successive portions of 800 milliliters and 500 milliliters of ether, the solid phase disappearing during the first equilibration, and the combined extracts were dried over anhydrous magnesium sulfate and evaporated to 586 grams of oil. The oil was dissolved in 2.2 liters of methanol to which was rapidly added 177 grams (1.05 moles) of DL-tartaric acid monohydrate in 1.5 liters of methanol while stirring. Precipitation began immediately and the mixture was allowed to stand quietly at room temperature for 2.5 hours when it was filtered and the filter cake was washed four times with 250 milliliter portions of methanol and dried to give 506 grams of DL-tartrate salt, M.P. 222–228°.

To convert to the hydrochloride salt, the 506 grams was stirred in a mixture of 1.6 liters of 10 percent aqueous sodium hydroxide and 2 liters of ether until the solid had disappeared. The aqueous phase was re-extracted with two successive 0.5 litre portions of ether and the combined extracts were dried over anhydrous magnesium sulfate. Evaporation of the ether gave 401 grams of oil which was dissolved in 1.25 liters of methanol and 0.35 liter of dry ether containing 48 grams of dry hydrogen chloride was added rapidly with stirring. This solution was quickly diluted with 2.5 liters of dry ether. After standing 40 minutes, the precipitate was filtered, washed twice with 400 milliliter portions of 3:1 dry ether-methanol and then 500 milliliters dry ether to give 416 grams of α-racemate, M.P. 248–253°.

*Example 6.—2,2-diphenyl-4-(2-piperidyl)-1,3-dioxolane hydrochloride, alpha-racemate*

The 4.1 grams (0.0282 mole) of alpha-racemate of 2-piperidyl-1,2-ethanediol (Preparation 13) was dissolved in 15 milliliters of methanol and neutralized with a solution of alcoholic hydrogen chloride. A solution of 6.5 grams (0.0282 mole) of dimethoxydiphenylmethane in isopropyl alcohol was added and hydrogen chloride gas was added until the mixture was slightly acidic. The mixture was heated in an oil bath at 120 to 130° for four hours, allowing the solvents to distill from the reaction. The mixture was washed with ether three times, twice with cold isopropyl alcohol to give 3.3 grams of crystalline material which was recrystallized from a mixture of methyl and isopropyl alcohols to give 1.8 grams of the alpha-racemate of 2,2-diphenyl-4-(2-piperidyl)-1,3-dioxolane hydrochloride, melting at 257–260°. See Example 5.

*Analysis.*—Calculated for $C_{20}H_{23}NO_2 \cdot HCl$: C, 69.45; H, 6.99; N, 4.05. Found: C, 69.19; H, 6.73; N, 4.34.

This compound is a spasmolytic, local anesthetic, central nervous system depressant, an anti-convulsant, and a parasympathetic blocking agent.

*Example 7.—(+)2,2-diphenyl-4-(2-piperidyl)-1,3-dioxolane(+)-tartrate from alpha-racemate*

A suspension of 24.45 grams (0.0707 mole) of 2,2-diphenyl-4-(2-piperidyl)-1,3-dioxolane hydrochloride (Example 3) in 100 milliliters (0.5 mole) of 20 percent aqueous sodium hydroxide was extracted with two 100-milliliter portions and two 50-milliliter portions of ether. The combined ethereal extracts were dried over anhydrous magnesium sulfate and concentrated to 21.5 grams of oily free base. This was dissolved in 80 milliliters of methanol and treated with a solution of 5.83 grams (0.0389 mole) of L-(+)-tartaric acid in 80 milliliters of methanol. After two and one-half hours at room temperature the crystalline product was filtered, washed and dried to a constant weight of 11.44 grams (84 percent of the theoretical yield). This was extracted from a Soxhlet thimble into 100 milliliters of methanol to yield 10.80 grams (80 percent of the theoretical yield) of the L-(+)-tartrate salt of the dextrorotatory form of the racemic base (derived from Example 3), melting at 248–254° with decomposition.

*Analysis.*—Calculated for $(C_{20}H_{23}NO_2)_2 \cdot C_4H_6O_6$: C, 68.73; H, 6.82; N, 3.64. Found: C, 69.09; H, 6.77; N, 3.69.

This compound is an anti-convulsant and causes prolongation of barbiturate hypnosis.

*Example 8.—(−)2,2-Diphenyl-4-(2-piperidyl)-1-3-dioxolane(−)tartrate from alpha-racemate*

The mother liquor from Example 7 was evaporated to dryness, suspended in 25 milliliters of 20 percent aqueous sodium hydroxide and extracted with two 50-milliliter portions and one 100-milliliter portion of ether. The combined ethereal extracts were dried over anhydrous magnesium sulfate and concentrated to 12.2 grams of oily free base. This was dissolved in 45 milliliters of methanol and treated with a solution of 3.39 grams (0.0226 mole) of D(−)-tartaric acid in 45 milliliters of methanol. After two and one-half hours at room temperature the crystalline product was filtered, washed and dried to a constant weight of 10.90 grams (80 percent of the theoretical yield). This was extracted from a Soxhlet thimble into 100 milliliters of methanol to yield 10.09 grams (74 percent of the theoretical yield) of the D-(−)-tartrate salt of the levorotatory form of the racemic base (derived from Example 3), melting at 248–254° with decomposition.

*Analysis.*—Calculated for $(C_{20}H_{23}NO_2)_2 \cdot C_4H_6O_6$: C, 68.73; H, 6.82; N, 3.64. Found: C, 69.09; H, 6.77; N, 3.69.

This compound is an anti-convulsant and causes prolongation of barbiturate hypnosis.

*Example 9.—(+)2,2-diphenyl-4-(2-piperidyl)-1,3-dioxolane hydrochloride from alpha-racemate*

A suspension of 9.00 grams (0.0117 mole) of the product from Example 7 in 40 milliliters of 10 percent aqueous sodium hydroxide was extracted with three 50-milliliter portions of ether. The combined ethereal extracts were dried over anhydrous magnesium sulfate and concentrated to 7.25 grams of oily free base. This was dissolved in 22.5 milliliters of methanol and acidified to pH 1.5 with 6.7 milliliters (0.023 mole) of 3.5 molar dry hydrogen chloride in anhydrous ether. Crystals began to form near the end of the acidification and the precipitation was completed by the addition of 50 milliliters of anhydrous ether. After standing at room temperature for two hours the product was filtered, washed and dried to constant weight of 7.00 grams (86 percent of the theoretical yield) of the dextrorotatory form of 2,2-diphenyl-4-(2-piperidyl)-1,3-dioxolane hydrochloride (alpha-racemate), melting at 248–254° with decomposition, $\alpha_D^{20}$ +34° (2 percent in methanol).

Analysis.—Calculated for $C_{20}H_{23}NO_2 \cdot HCl$: C, 69.45; H, 6.99; Cl, 10.25. Found: C, 69.92; H, 7.15; Cl, 10.15.

This compound is a spasmolytic, local anesthetic, analgesic, central nervous system depressant and a parasympathetic blocking agent.

Example 10.—(—)2,2-diphenyl-4-(2-piperidyl)-1,3-dioxolane hydrochloride from alpha-racemate Using the procedure of Example 9, the product from Example 8 was converted to the hydrochloride salt of the levorotatory base, 2,2-diphenyl-4-(2-piperidyl)-1,3-dioxolane, melting at 248–254 degrees with decomposition, $\alpha_D^{20}$ —34.5° (2 precent in methanol).

Analysis.—Calculated for $C_{20}H_{23}NO_2 \cdot HCl$: C, 69.45; H, 6.99; Cl, 10.25. Found: C, 69.22; H, 6.71; Cl, 9.98.

This compound is a spasmolytic, local anesthetic, anti-arrythmic and a parasympathetic blocking agent.

Example 11.—2-ethyl-2-phenyl-4-(2-piperidyl)-1-3-dioxolane Hydrochloride

Following the procedure of Example 24, except that 20 milliliters of n-butanol was used as solvent, 37 grams of 2-piperidyl-1,2-ethanediol hydrochloride and 28 grams of propiophenone were condensed at 125°. The reaction product was triturated with ether which threw down a white precipitate. The solid was recrystallized from isopropanol to give 2-ethyl-2-phenyl-4-(2-piperidyl)-1,3-dioxolane hydrochloride, melting at 256–257°.

Analysis.—Calculated for $C_{16}H_{23}NO_2 \cdot HCl$: C, 64.52; H, 8.12; N, 4.70. Found: C, 64.40; H, 7.89; N, 4.83.

This compound is a spasmolytic and an anti-convulsant.

Example 12.—2-ethyl-2-phenyl-4-(2-piperidyl)-1,3-dioxolane hydrochloride, alpha-racemate A mixture of 145.7 grams (0.8 mole) of the alpha-racemate of 2-piperidyl-1,2-ethanediol hydrochloride (from Preparation 14) and 209 grams of 1-phenyl-1,1-dipropoxypropane in 900 milliliters of isopropanol was brought to reflux and gaseous anhydrous hydrogen chloride was introduced until acidity was pH 2. Refluxing was continued for about one hour during which time a white crystalline solid precipitated. The solid was filtered, washed twice with 300 milliliter portions of isopropanol and then with one liter of dry ether. Recrystallization from ethanol gave 175 grams of the alpha-racemate of 2-ethyl-2-phenyl-4-(2-piperidyl)-1,3-dioxolane hydrochloride, melting at 251.5–253°.

Analysis.—Calculated for $C_{16}H_{23}NO_2 \cdot HCl$: C, 64.52; H, 8.12; N, 4.70. Found: C, 64.50; H, 8.48; N, 4.85.

This compound is a spasmolytic, anti-convulsant and central nervous system depressant.

1-phenyl-1,1-dipropoxypropane was prepared as follows: Propiophenone (140 grams, 0.66 mole), 320 grams of n-propanol, 107 grams of 2,2-dimethoxypropane, 200 milliliters of hexane and 0.2 gram of p-toluenesulfonic acid monohydrate were heated in a 2 liter flask fitted with a dropping funnel and a 28 plate Oldershaw distillation column. Distillate was removed from the column at such a rate that the overhead temperature was held at 48–49°. The distillation period was approximately 10 hours during which 456 milliliters of distillate was collected while a total of 280 milliliters of hexane was added in three portions through the dropping funnel. The final distillate, collected at a very high reflux ratio, boiled at 64°. The reaction mixture was stabilized by adding 0.2 gram (or sufficient to produce an alkaline reaction) of sodium methylate, placed in a low pressure distillation apparatus with a vacuum jacketed 25 cm. Vigreux column and stripped of solvents at reduced pressure. The residue was then distilled and the portion boiling at 86–92° (3 mm.) was redistilled to give 131 grams (56 percent), B.P. 89–90° (2.5–3 mm.).

Example 13.—2-ethyl-2-phenyl-4-(2-piperidyl)-1,3-dioxolane hydrochloride, gamma-racemate The ethanolic mother liquor from the recrystallization of the alpha racemate in Example 12 was evaporated to an oily crystalline residue of 53 grams. By dissolving in ethanol and diluting with ether a 35 gram crop of alpha racemate was recovered. The mother liquor was evaporated and the 18 gram residue was converted to the free base in ether by the addition of 30 milliliters of 10 percent sodium hydroxide. After drying the ether solution and removing the ether, a solution of the 17.2 gram residual oily base in 50 milliliters of methanol was mixed with a solution of 6 grams of DL-tartaric acid monohydrate in 60 milliliters of methanol. The volume was reduced to about 50 milliliters and after diluting with a few milliliters of ether several crops of a tartrate salt were collected. The mother liquor was evaporated to a viscous oil; the crops of crystalline tartrate salt were combined, suspended in water (50 milliliters), filtered and the aqueous filtrate was used to dissolve the above viscous, oily residue. The free base obtained by neutralizing this solution with 10 percent sodium hydroxide weighed 8.9 grams. This base was dissolved in 60 milliliters ethanol and alcoholic hydrogen chloride was added until the pH was about 2. A 3.3 gram crop of the alpha racemate precipitated. The filtrate was concentrated to half its volume and diluted with a little ether. A 2 gram crop precipitated, melting at 200–236°. The filtrate was evaporated and the oily residue was triturated with dry ether to give a white crystalline product melting at about 166°, resolidifying at about 200 and remelting at 236°. Converting to the free base in ether and neutralized with ethereal hydrogen chloride gave 2.4 grams of white crystals of the gamma racemate of 2-ethyl-2-phenyl-4-(2-piperidyl)-1,3-dioxolane hydrochloride, melting at 175–177°, resolidifying at 195° and remelting at 241°.

Analysis.—Calculated for $C_{16}H_{23}NO_2 \cdot HCl$: C, 64.52; H, 8.12; Cl, 11.90. Found: C, 64.60; H, 8.18; Cl, 11.58.

The infrared spectrum, water and ethanol solubilities differ widely from those of the alpha racemate. The compound is an anticonvulsant.

Example 14.—2-ethyl-2-phenyl-4-(2-piperidyl)-1,3-dioxolane hydrochloride, beta racemate By the procedure of Example 12 but using the beta racemate of 2-piperidyl-1,2-ethanediol hydrochloride (from Preparation 15), the beta racemate of 2-ethyl-2-phenyl-4-(2-piperidyl)-1-3-dioxolane hydrochloride was obtained, melting at 250–251°.

Analysis.—Calculated for $C_{16}H_{23}NO_2 \cdot HCl$: C, 64.52; H, 8.12; N, 4.70. Found: C, 64.28; H, 8.16; N, 4.92.

The infrared spectrum differed significantly from either of those for the alpha or gamma racemates. This compound is an anticonvulsant and a spasmolytic.

Example 15.—2-phenyl-4-(2-piperidyl)-1,3-dioxolane hydrochloride

Following the procedure of Example 2, 30 grams of dimethoxyphenylmethane and 18.1 grams of 2-piperidyl-1,2-ethanediol hydrochloride were condensed and the product was crystallized twice from ethanol to give 11.6 grams of 2-phenyl-4-(2-piperidyl)-1,3-dioxolane hydrochloride melting at 221°.

Analysis.—Calculated for $C_{14}H_{19}NO \cdot HCl$: C, 62.33; H, 7.47; N, 5.19. Found: C, 62.34; H, 7.20; N, 5.40.

This compound is a spasmolytic and local anesthetic.

*Example 16.—2-methyl-2-phenyl-4-(2-piperidyl)-1,3-dioxolane hydrochloride, beta racemate*

Following the procedure of Example 12, 18.1 grams of the beta racemate of 2-piperidyl-1,2-ethanediol hydrochloride and 22.2 grams of 1-phenyl-1,1-dipropoxyethane were condensed and the product was crystallized twice from ethanol to give 10.1 grams of the beta racemate of 2-methyl-2-phenyl-4-(2-piperidyl)-1,3-dioxolane hydrochloride melting at 241–243°.

Analysis.—Calculated for $C_{15}H_{21}NO_2 \cdot HCl$: C, 63.48; H, 7.81; N, 4.94. Found: C, 63.88; H, 7.98; N, 4.97.

This compound is a spasmolytic.

The 1-phenyl-1,1-dipropoxyethane was prepared by the same procedure as that described in the last part of Example 12 using acetophenone in place of propiophenone. The product boils at 75° at 3 mm., $n_D^{25}$ 1.4747.

*Example 17.—2-(4-chlorophenyl)-2-phenyl-4-(2-piperidyl)-1,3-dioxolane hydrochloride*

Following the procedure of Example 2, 39 grams of 4-chlorophenyldimethoxyphenylmethane and 27 grams of 2-piperidyl-1,2-ethanediol hydrochloride were allowed to react to give a product which was crystallized first from ethanol then recrystallized from methanol to give 5.5 grams of 2-(4-chlorophenyl)-2-phenyl-4-(2-piperidyl)-1,3-dioxolane hydrochloride melting at 265–267°.

Analysis.—Calculated for $C_{20}H_{22}ClNO_2 \cdot HCl$: C, 63.16; H, 6.10; N, 3.68. Found: C, 63.34; H, 6.50; N, 4.10.

This compound is a spasmolytic and local anesthetic.

To prepare 4 - chlorophenyldimethoxyphenylmethane 110 grams of 4-chlorobenzophenone, 112 grams of phosphorus pentachloride, 500 milliliters of benzene and 150 milliliters of carbon disulfide were mixed and refluxed for two hours. The solvent was removed at reduced pressure and the residue distilled to give 116 grams of dichloro-(4-chlorophenyl)-phenylmethane boiling at 154–157° at 2.7 millimeters of mercury pressure and having an $n_D^{25}$ of 1.6103.

A solution of 20 grams of sodium in cold methanol was prepared and cooled in an ice bath. A stream of dry nitrogen gas was passed through continuously while a cold methanolic solution of dichloro-(4-chlorophenyl) phenylmethane was added dropwise with stirring at a reaction temperature of 10–15°. After standing an hour the reaction mixture was refluxed one hour and a precipitate of sodium chloride removed by filtration. The solvent was removed by distillation and the residue treated with methanol to form two liquid phases of which the lower phase was separated and distilled to give 84.5 grams of the product boiling at 128° at one millimeter of mercury pressure and having an $n_D^{25}$ of 1.5667.

Analysis.—Calculated for $C_{15}H_{15}ClO_2$: C, 68.57; H, 5.75; Cl, 13.50. Found: C, 69.03; H, 5.75; Cl, 13.51.

*Example 18.—2,2-bis-(4-chlorophenyl)-4-(2-piperidyl)-1,3-dioxolane hydrochloride*

Following the procedure of Example 2, but omitting the solvent equal molar quantities of 2-piperidyl-1,2-ethanediol hydrochloride and bis-(4-chlorophenyl)dimethoxymethane were condensed to give 2,2-bis-(4-chlorophenyl-4-(2-piperidyl)-1,3-dioxolane hydrochloride (crystals from isopropyl alcohol) which melted at 210–215°.

Analysis.—Calculated for $C_{20}H_{21}Cl_2NO_2 \cdot HCl$: C, 57.91; H, 5.35; N, 3.38. Found: C, 58.10; H, 5.13; N, 3.19.

This compound is a spasmolytic and local anesthetic.

To prepare bis(4-chlorophenyl)dimethoxymethane, 100 grams of 4,4'-dichlorobenzophenone, 12 grams of phosphorus oxychloride and 91 grams of phosphorus pentachloride were heated on the steam bath and stirred continuously with 120 milliliters of toluene for 5 hours and then evaporated at reduced pressure. The residue was extracted with benzene, the benzene solution distilled, and the residue crystallized from pentane to give 93 grams of bis-(4-chorophenyl)dichloromethane, melting at 51–53°.

The bis-(4-chlorophenyl)dichloromethane, dissolved in 230 milliliters of methanol in a reaction flask flushed by nitrogen was chilled and mixed with a cold solution of 14 grams of sodium in 180 milliliters of methanol using an ice bath to maintain a maximum temperature of 10° for three-quarters of an hour. The mixture was allowed to warm and was finally refluxed for two hours. The reaction solution was filtered and concentrated at reduced pressure to give two successive crystal crops which were combined and recrystallized from isopropyl alcohol to give 66 grams of bis-(4-chlorophenyl)dimethoxymethane melting at 71–73°.

Analysis.—Calculated for $C_{15}H_{14}Cl_2O_2$: C, 60.62; H, 4.75. Found: C, 60.97; H, 4.57.

*Example 19.—2,2-bis(4-methoxyphenyl)-4-(2-piperidyl)-1,3-dioxolane hydrochloride, alpha racemate*

Following the procedure described for Example 12, 18.1 grams of 2-piperidyl-1,2-ethanediol hydrochloride (alpha racemate) was reacted with 33.7 grams of bis(4-methoxyphenyl)-dipropoxymethane and the crude product was recrystallized from dimethylsulfoxide to give 2,2-bis(4-methoxyphenyl)-4-(2-piperidyl)-1,3-dioxolane hydrochloride (alpha racemate), melting at 282–283° (d).

Analysis.—Calculated for $C_{22}H_{27}NO_4 \cdot HCl$: C, 65.10; H, 6.95; Cl, 8.73. Found: C, 64.70; H, 7.09; Cl, 8.65.

This compound is a spasmolytic and local anesthetic.

For the preparation of bis(4-methoxyphenyl)dipropoxymethane, 4,4'-dimethoxybenzophenone (90 grams, 0.37 mole) was dissolved in 350 milliliters of benzene and 94 grams (0.71 mole) of oxalyl chloride was added dropwise during a 2 hour period of stirring. Following an additional hour of stirring, the evolution of gases was completed by one hour of reflux and evaporation of all volatile material at reduced pressure. The residue was a red crystalline mass, M.P. 100–105°. This material was dissolved in 300 milliliters of dry benzene and added dropwise over a 2 hour period to a stirred solution of sodium propoxide in n-propanol at 5°. The latter solution was prepared by carefully adding 450 milliliters of dry n-propanol to 18 grams (0.78 gram-atom) of sodium. After adding the benzene solution the reaction mixture slowly warmed to room temperature and was filtered. The filtrate was concentrated to an oil which was distilled without fractionation to give 85 grams (69 percent based on the ketone) of product, B.P. 170–172° (1 mm.).

*Example 20.—2-phenyl-4-(2-piperidyl)-2(2-thienyl)-1,3-dioxolane hydrochloride, alpha racemate*

Following the procedure of Example 12, 5.3 grams of 2-piperidyl-1,2-ethanediol hydrochloride (alpha racemate) and 15.9 grams of dimethoxyphenyl-2-thienylmethane were reacted to give a crude product which was recrystallized from isopropanol and then ethanol-isopropanol. The 2-phenyl-4-(2-piperidyl)-2-(2-thienyl)-1,3-dioxolane hydrochloride melted at 221–223°.

Analysis.—Calculated for $C_{18}H_{21}NO_2S \cdot HCl$: C, 61.43; H, 6.30; S, 9.12. Found: C, 61.29; H, 6.22; Cl, 9.54.

This compound is a spasmolytic and local anesthetic.

The dimethoxyphenyl-2-thienylmethane was prepared from dichlorophenyl-2-thienylmethane and sodium methoxide according to the procedure described in the last part of Example 17. It crystallized from isopropanol, melting at 56–59°.

*Example 21.—2-phenyl-4-(2-piperidyl)-2-(2-thienyl)-1,3 dioxolane hydrochloride, beta racemate*

Following the procedure of Example 12, 9.4 grams of 2-piperidyl-1,2-ethanediol hydrochloride (beta racemate) was reacted with 12.4 grams of dimethoxyphenyl-2-thienylmethane to give a product which was recrystallized from isopropanol-methanol and melted at 282° (d).

*Analysis.*—Calculated for $C_{18}H_{21}NO_2S \cdot HCl$: C, 61.43; H, 6.30; S, 9.12. Found: C, 61.13; H, 6.14; Cl, 9.34.

This compound is a spasmolytic and local anesthetic.

*Example 22.—2-benzyl-4-(2-piperidyl)-1,3-dioxolane hydrochloride*

Following the procedure of Example 2, 50 grams of 1,1-dimethoxy-2-phenylethane and 48 grams of 2-piperidyl-1,2-ethanediol hydrochloride were condensed and the oily reaction product crystallized by triturating with a mixture of benzene and petroleum ether. The product was recrystallized from methanol by diluting with benzene and petroleum ether to give 7.7 grams of the 2-benzyl-4-(2-piperidyl)-1,3-dioxolane hydrochloride melting at 163–165°.

*Analysis.*—Calculated for $C_{15}H_{21}NO_2 \cdot HCl$: C, 63.48; H, 7.82; N, 4.94. Found: C, 63.00; H, 7.67; N, 5.12.

This compound is a spasmolytic, local anesthetic and an anticonvulsant.

*Example 23.—2-benzyl-2-phenyl-4-(2-piperidyl)-1,3-dioxolane hydrochloride, alpha racemate*

Using the procedure of Example 12, 33 grams of benzylphenyldipropoxymethane and 20 grams of the alpha racemate of 2-piperidyl-1,2-ethanediol hydrochloride were condensed to give 20 grams of the alpha racemate of 2-benzyl-2-phenyl-4-(2-piperidyl)-1,3-dioxolane hydrochloride, melting at 240–244°.

*Analysis.*—Calculated for $C_{21}H_{25}NO_2 \cdot HCl$: C, 70.08; H, 7.28; N, 3.89. Found: C, 70.05; H, 7.22; N, 4.01.

This compound is a spasmolytic, local anesthetic and an anticonvulsant.

The benzylphenyldipropoxymethane, prepared by the procedure described in the last part of Example 12 from desoxybenzoin, boiled at 144–146° at 3 mm.

*Example 24.—2,2-dibenzyl-4-(2-piperidyl)-1,3-dioxolane hydrochloride*

26.1 grams of 2-piperidyl-1,2-ethanediol hydrochloride and 37.7 grams of dibenzyl ketone were mixed together with 75 milliliters of isopropanol and enough dry hydrogen chloride gas was added beneath the liquid surface to give the mixture a strong acidic reaction. The reaction flask was then heated on the steam bath, replacing the solvent as it was removed, for a period of 13 hours. The remaining solvent was removed at reduced pressure and the residue allowed to stand under ethyl ether for several days. A crop of crystals separated which was recrystallized from isopropanol to give 4.8 grams of 2,2-dibenzyl-4-(2-piperidyl)-1,3-dioxolane hydrochloride, melting at 183–186°.

*Analysis.*—Calculated for $C_{22}H_{27}NO_2 \cdot HCl$: C, 70.66; H, 7.55; N, 3.75. Found: C, 70.51; H, 7.51; N, 3.73.

*Example 25.—2,2-dibenzyl-4-(2-piperidyl)-1,3-dioxolane hydrochloride, alpha racemate*

Using the procedure of Example 12, 31.2 grams of dibenzyldipropoxymethane and 18.1 grams of the alpha racemate of 2-piperidyl-1,2-ethanediol hydrochloride were condensed to give 23.5 grams of the alpha racemate of 2,2-dibenzyl-4-(2-piperidyl)-1,3-dioxolane hydrochloride, melting at 184–185°.

*Analysis.*—Calculated for $C_{22}H_{27}NO_2 \cdot HCl$: C, 70.66; H, 7.55; N, 3.75. Found: C, 70.55; H, 7.57; N, 4.33.

This compound is a spasmolytic and local anesthetic.

The dibenzyl dipropoxymethane, prepared by the procedure described in the last part of Example 12 from dibenzyl ketone boiled at 147–154° (3 mm.), $n_D^{25}$ 1.5623.

*Example 26.—2,2-dibenzyl-4-(2-piperidyl)-1,3-dioxolane hydrochloride, beta racemate*

Using the procedure of Example 12, 34.3 grams of dibenzyldipropoxymethane and 18.1 grams of the beta racemate of 2-piperidyl-1,2-ethanediol hydrochloride were condensed to give 25 grams of the beta racemate of 2,2-dibenzyl - 4 - (2 - piperidyl)-1,3-dioxolane hydrochloride, melting at 245°.

*Analysis.*—Calculated for $C_{22}H_{27}NO_2 \cdot HCl$: C, 70.66; H, 7.55; N, 3.75. Found: C, 70.86; H, 7.70; N, 3.71.

This compound is a spasmolytic and local anesthetic.

*Example 27.—2-diphenylmethyl-2-methyl-4-(2-piperidyl)-1,3-dioxolane hydrochloride, beta racemate*

Following the procedure of Example 12, 18.1 grams of 2-piperidyl-1,2-ethanediol hydrochloride (beta racemate) was reacted with 1,1-diphenyl-2,2-dipropoxy propane. The reaction mixture was diluted with ether to give a crude product which was recrystallized from isopropanol-ether and then from ethanol to give 2-diphenylmethyl-2-methyl-4-(2-piperidyl)-1,3-dioxolane hydrochloride, melting at 205–210°.

*Analysis.*—Calculated for $C_{22}H_{27}NO_2 \cdot HCl$: C, 70.67; H, 7.55; Cl, 9.48. Found: C, 70.59; H, 7.60; Cl, 9.55.

This compound is a spasmolytic, local anesthetic and an anticonvulsant.

The 1,1-diphenyl-2,2-dipropoxypropane, prepared by the procedure described in the last part of Example 12 from 1,1-diphenylacetone, boiled at 132–135° (1 mm.) $n_D^{25}$ 1.5620.

*Example 28.—2,2-dicyclohexyl-4-(2-piperidyl)-1,3-dioxolane chloride*

Following the procedure of Example 24, except that 100 milliliters of n-butanol was used as a reaction solvent, 27.5 grams of 2-piperidyl-1,2-ethanediol hydrochloride and 30 grams of dicyclohexyl ketone were condensed and the product was induced to crystallize by hot ether extraction of the reaction mixture. It was recrystallized from isopropanol to give 2,2-dicyclohexyl-4-(2-piperidyl)-1,3-dioxolane hydrochloride, melting at 243–245°.

*Analysis.*—Calculated for $C_{20}H_{35}NO_2 \cdot HCl$: C, 67.10; H, 10.14; N, 3.91. Found: C, 67.09; H, 9.98; N, 4.04.

This compound is a spasmolytic and local anesthetic

*Example 29.—2,2-dicyclohexyl-4-(2-piperidyl)-1,3-dioxolane hydrochloride, beta racemate*

The beta racemate of 2,2-diphenyl-4-(2-piperidyl)-1,3-dioxolane hydrochloride (17.3 grams, 0.05 mole) (Example 4), converted to the free base with dilute sodium hydroxide, was dissolved in 100 milliliters of glacial acetic acid and hydrogenated at 60 p.s.i., using 3 grams rhodium on alumina (5 percent) catalyst. After the theoretical amount of hydrogen had been consumed, the solution was filtered, the acetic acid was removed (1 mm. pressure) and the product was extracted with ether after adding excess dilute sodium hydroxide solution. The ether solution was dried over anhydrous magnesium sulfate and neutralized with an ethereal solution of hydrogen chloride. The precipitated product was crystallized from isopropanol to give the beta racemate of 2,2-dicyclohexyl-4-(2-piperidyl)-1,3-dioxolane hydrochloride, melting at 288° (d.).

*Analysis.*—Calculated for $C_{20}H_{35}NO_2 \cdot HCl$: C, 67.10; H, 10.14; Cl, 9.91. Found: C, 67.07; H, 9.5; Cl, 9.51.

This compound is a spasmolytic and local anesthetic.

*Example 30.—4-(1-methyl-2-piperidyl)-2,2-diphenyl-1,3-dioxolane hydrochloride, alpha racemate*

To a solution of 12.1 grams of 2,2-diphenyl-4-(2-piperidyl)-1,3-dioxolane hydrochloride (alpha racemate) (Example 3) and 15 grams of 37 percent formalin in 140 milliliters of methanol was added 2 grams of 10 percent palladium on charcoal. This mixture was then shaken with hydrogen gas at 50 pounds per square inch. Absorption of hydrogen stopped after 3.5 hours with the uptake of one mole of hydrogen per mole of dioxolane. The catalyst was removed and the solution evaporated to a solid residue which was crystallized from isopropyl alcohol to give 9.3 grams of 4-(1-methyl-2-piperidyl)-2,2-diphenyl-1,3-dioxolane hydrochloride (alpha racemate), melting at 268–275°.

*Analysis.*—Calculated for $C_{21}H_{25}NO_2 \cdot HCl$: C, 70.08; H, 7.28; N, 3.89. Found: C, 70.40; H, 7.38; N, 3.93.

This compound is a spasmolytic, local anehthetic and an anticonvulsant.

*Example 31.—4-(1-methyl-2-piperidyl)-2,2-diphenyl-1,3-dioxolane hydrochloride, beta racemate*

Following the procedure of Example 30, 2,2-diphenyl-4-(2-piperidyl)-1,3-dioxolane hydrochloride (Example 4) was converted to 4-(1-methyl-2-piperidyl)-2,2-diphenyl-1,3-dioxolane hydrochloride melting at 183–185°.

*Analysis.*—Calculated for $C_{21}H_{25}NO_2 \cdot HCl$: C, 70.08; H, 7.28; N, 3.89. Found: C, 70.38; H, 7.16; N, 4.01.

This compound is a spasmolytic and local anesthetic.

*Example 32.—(+)-4-(1-methyl-2-piperidyl)-2,2-diphenyl-1,3-dioxolane hydrochloride, from alpha racemate*

Following the procedure of Example 30, (+)2,2-diphenyl-4-(2-piperidyl)-1,3-dioxolane hydrochloride from Example 9 was converted to (+)-4-(1-methyl-2-piperidyl)-2,2-diphenyl-1,3-dioxolane hydrochloride, melting at 275–287° (d.), $\alpha_D^{25}$+31.8° (C=1.0 in methanol).

*Analysis.*—Calculated for $C_{21}H_{25}NO_2 \cdot HCl$: C, 70.08; H, 7.28; Cl, 9.85. Found: C, 69.83; H, 7.46; Cl, 9.81.

This compound is a spasmolytic, local anesthetic and an anticonvulsant.

*Example 33.—(−)-4-(1-methyl-2-piperidyl)-2,2-diphenyl-1,3-dioxolane hydrochloride, from alpha racemate*

Following the procedure of Example 30, (−)-2,2-diphenyl-4-(2-piperidyl)-1,3-dioxolane hydrochloride from Example 10 was converted to (−)-4-(1-methyl-2-piperidyl)-2,2-diphenyl-1,3-dioxolane hydrochloride, melting at 383–287° (d.) $\alpha_D^{24}$−30.7° (C=1 in methanol).

*Analysis.*—Calculated for $C_{21}H_{25}NO_2HCl$: C, 70.08; H, 7.28; Cl, 9.85. Found: C, 69.83; H, 7.46; Cl, 9.81.

This compound is a spasmolytic and local anesthetic.

*Example 34.—1,1-dimethyl-2-(2,2-diphenyl-1,3-dioxolan-4-yl)piperidinuium iodide, alpha racemate*

An aqueous solution of 4.5 grams of 4-(1-methyl-2-piperidyl)-2,2-diphenyl-1,3-dioxolane hydrochloride (Example 30) was made alkaline with potassium hydroxide solution and extracted with ethyl ether. The ether solution was dried over potassium carbonate, the solution was evaporated to a solid residue which was dissolved in methanol and refluxed with excess methyl iodide for two hours. The solvents were removed by distillation and the residue crystallized from ethanol to give 2.6 grams of 1,1-dimethyl-2-(2,2-diphenyl-1,3-dioxolan-4-yl)piperidinium iodide (alpha racemate), melting at 211–214°.

*Analysis.*—Calculated for $C_{22}H_{28}INO_2$: C, 56.78; H, 6.06; N, 3.01. Found: 56.46; H, 5.84; N, 2.80.

This compound is a spasmolytic.

*Example 35.—1,1-dimethyl-2-(2,2-diphenyl-1,3-dioxolan-4-yl)piperidinium iodide, beta racemate*

Following the procedure of Example 34, 4-(1-methyl-2-piperidyl)-2,2-diphenyl-1,3-dioxolane hydrochloride (Example 31) was converted to 1,1-dimethyl-2-(2,2-diphenyl-1,3-dioxolan-4-yl)piperidinium iodide (beta racemate), melting at 237–238°.

*Analysis.*—Calculated for $C_{22}H_{28}INO_2$: C, 56.78; H, 6.06; N, 3.01. Found: C, 56.93; H, 6.06; N, 3.11.

This compound is a spasmolytic.

*Example 36.—2,2-diphenyl-4-(1-propionyl-2-piperidyl)-1,3-dioxolane, alpha racemate*

2,2 - diphenyl-4-(2-piperidyl)-1,3-dioxolane hydrochloride (alpha racemate) (17.5 grams from Example 3) was placed in a flask with 50 milliliters of 40 percent sodium hydroxide, 150 milliliters ethylene dichloride and stirred for 1.5 hours to decompose the hydrochloride. Then 10 grams of propionyl chloride in 25 milliliters of ethylene dichloride was added dropwise for a period of one hour to the reaction mixture, held at 0–5° temperature, with constant stirring. The mixture then was allowed to warm up to room temperature and the phases were separated. The solvent was evaporated and the oil crystallized. It was recrystallized from ether-pentane to give 2,2-diphenyl-4-(1-propionyl-2-piperidyl)-1,3 - dioxolane (alpha racemate), melting at 92–93.5°.

*Analysis.*—Calculated for $C_{23}H_{27}NO_3$: C, 75.58; H, 7.45; N, 3.83. Found: C, 75.61; H, 7.09; N, 3.98.

This compound is an intermediate for the preparation of the compound described in Example 38.

*Example 37.—2,2-diphenyl-4-(1-propionyl-2-piperidyl)-1,3-dioxolane, beta racemate*

Following the procedure described for Example 36, 2,2-diphenyl-4-(2-piperidyl)-1,3-dioxolane hydrochloride, beta racemate from Example 4, was reacted with caustic and propionyl chloride to give 2,2-diphenyl-4-(1-propionyl-2-piperidyl)-1,3-dioxolane (beta racemate), which was recrystallized from ether-pentane twice, melting at 123–125°.

*Analysis.*—Calculated for $C_{23}H_{27}NO_3$: C, 75.58; H, 7.45; N, 3.83. Found: C, 75.28; H, 7.02; N, 3.92.

This compound is an intermediate for the preparation of the compound described in Example 39.

*Example 38.—2,2-diphenyl-4-(1-propyl-2-piperidyl)-1,3-dioxolane hydrochloride, alpha racemate*

In a 1 liter flask flushed with dry nitrogen was placed 80 milliliters of absolute ether and 1.3 grams of lithium aluminum hydride and the suspension was stirred vigorously while adding, dropwise, 10.3 grams of 2,2-diphenyl-4-(1-propionyl-2-piperidyl) - 1,3-dioxolane (alpha racemate from Example 36) dissolved in 350 milliliters of ether. After a two hour addition period, the stirring was continued for 20 hours and then 25 milliters of water was slowly added. The ether phase was separated and then evaporated to an oil. The oil was dissolved in 100 milliliters of benzene and treated with 0.88 grams of hydrogen chloride dissolved in 14 milliliters of isopropanol. The solvent was then removed and the residue treated with ether to give crystals which were recrystallized from isopropanol-ether. The product, 2,2-diphenyl-4-(1-propyl-2-piperidyl)-1,3-dioxolane hydrochloride (alpha racemate) melted at 201–202°

*Analysis.*—Calculated for $C_{23}H_{29}NO_2 \cdot HCl$: C, 71.20; H, 7.80; Cl, 9.14. Found: C, 71.25; H, 7.79; Cl, 9.15.

This compound is a spasmolytic, local anesthetic and an anti-convulsant.

*Example 39.—2,2-diphenyl-4-(1-propyl-2-piperidyl)-1,3-dioxolane hydrochloride, beta racemate*

Following the procedure for Example 38, 10 grams of 2,2-diphenyl-4-(1-propionyl - 2 - piperidyl-1,3-dioxolane (from Example 37) were reduced with lithium aluminum hydride to give 2,2-diphenyl-4-(1-propyl-2-piperidyl)-1,3-dioxolane hydrochloride (beta racemate), melting at 170–171.5°.

*Analysis.*—Calculated for $C_{23}H_{29}NO_2 \cdot HCl$: C, 71.20; H, 7.80; N, 3.61. Found: C, 71.08; H, 7.71; N, 3.52.

This compound is a spasmolytic, local anesthetic and an anti-convulsant.

*Example 40.—4-(1-benzyl-2-piperidyl)-2,2-diphenyl-1,3-dioxolane hydrochloride, alpha racemate*

Thirty-two grams of the free base, 2,2-diphenyl-4-(2-piperidyl)-1,3-dioxolane, (alpha racemate) (prepared as as in the first part of Example 7) in 250 milliliters of benzene were treated with 8.5 grams of benzyl bromide at room temperature for one day while a precipitate developed and was filtered off. The filtrate was evaporated at reduced pressure and the residual oil was diluted with dry benzene and treated with 1.73 grams of dry hydrogen chloride in isopropanol solution. The solution was then evaporated to a hard glass which was triturated with dry ether to give a chalky precipitate. The precipitate was recrystallized from isopropanol-ethyl acetate and from ethyl acetate containing a small amount of isopropanol to give 4-(1-benzyl-2-piperidyl)-2,2-diphenyl-1,3 - dioxolane hydrochloride (alpha racemate), melting at 172–174°.

Analysis.—Calculated for $C_{27}H_{29}NO_2 \cdot HCl$: C, 74.38; H, 6.94; Cl, 8.13. Found: C, 74.34; H, 6.89; Cl, 8.21.

This compound is a central nervous system depressant.

Example 41.—4-(1-benzyl-2-piperidyl)-2,2-diphenyl-1,3-dioxolane hydrochloride, beta racemate By the procedure used in Example 40, except that the reaction was conducted in 100 milliliters of refluxing absolute ethanol for a period of approximately six hours, 18.5 grams of the free base of 2,2-diphenyl-4-(2-piperidyl)-1,3-dioxolane, (beta racemate) were reacted with 4.9 grams of benzyl bromide. The crude product was recrystallized from ethanol and then from methanol-ethyl acetate to give 4-(1-benzyl-2-piperidyl)-2,2-diphenyl-1,3-dioxolane hydrochloride (beta racemate), melting at 212–215°.

Analysis.—Calculated for $C_{27}H_{29}NO_2 \cdot HCl$: C, 74.38; H, 6.94; Cl, 8.13. Found: $H_2O$, 0.8; C, 73.30; H, 7.24; Cl, 7.99.

This compound is a spasmolytic.

Example 42.—(+)-4-(1-benzyl-2-piperidyl)-2,2-diphenyl-1,3-dioxolane hydrochloride, from the alpha racemate Following the procedure in Example 41, 195 grams of the free base of (+)-2,2-diphenyl-4-(2-piperidyl)-1,3-dioxolane (obtained from Example 9 by treatment with sodium hydroxide) and 40 grams of benzyl chloride in 400 milliliters of ethanol were refluxed six hours. The cooled solution was diluted with 300 milliliters of ether and the precipitated hydrochloride of the starting material was removed by filtration. The filtrate was neutralized with an ethereal solution of hydrogen chloride and the precipitated product was recrystallized from ethyl alcohol and ether to give (+)-4-(1-benzyl-2-piperidyl)-2,2-diphenyl-1,3-dioxolane hydrochloride, melting at 201.5–203°, $\alpha_D^{25}$ +16.75 (C=2 percent in methanol).

Analysis.—Calculated for $C_{27}H_{29}NO_2 \cdot HCl$: C, 74.38; H, 6.94; Cl, 8.13. Found: C, 74.16; H, 6.75; Cl, 8.37.

This compound is an anti-convulsant and a central nervous system depressant.

Example 43.—(−)-4-(1-benzyl-2-piperidyl)-2,2-diphenyl-1,3-dioxolane hydrochloride, from the alpha racemate Thirty-one grams of (−)-2,2-diphenyl-4-(2-piperidyl)-1,3-dioxolane free base obtained from Example 10, were dissolved in 250 milliliters of dry benzene and treated with 8.5 grams of benzyl bromide at room temperature for two days. The mixture was filtered and the filtrate was refluxed for two hours and a slight additional precipitate was separated. The filtrate was neutralized with dry hydrogen chloride in isopropanol solution. The solution was concentrated in vacuo to a glass which crystallized from isopropanol-ethyl acetate several times to give (−)-4-(1-benzyl-2-piperidyl)-2,2-diphenyl-1,3-dioxolane hydrochloride, melting at 205–206°, $\alpha_D^{25}$ (−)16.62 (C=2 in methanol).

Analysis.—Calculated for $C_{27}H_{29}NO_2 \cdot HCl$: C, 74.38; H, 6.94; Cl, 8.13. Found: C, 74.34; H, 6.89; Cl, 8.21.

This compound is a spasmolytic.

Example 44.—4[1-(2-hydroxyethyl)-2-piperidyl]-2,2-diphenyl-1,3-dioxolane hydrochloride, alpha racemate A solution of 15.4 grams of 2,2-diphenyl-4-(2-piperidyl)-1,3-dioxolane (alpha racemate free base from Example 3) and 2.2 grams of ethylene oxide in 75 milliliters of methanol and 25 milliliters of water were heated in a glass pressure vessel to 100° for 16.5 hours. The solution was then evaporated to dryness at reduced pressure on a steam bath, dissolved in isopropanol and re-evaporated and the residue mixed with benzene and re-evaporated. The oily residue was treated with 1.14 grams of dry hydrogen chloride in 24 milliliters of isopropanol giving a precipitate which was filtered. The mother liquor was evaporated and the residue digested with ether and refiltered to give a second crop. The combined crude products were recrystallized from ethanol-ether to give 4[1-(2-hydroxyethyl)-2-piperidyl]-2,2-diphenyl-1,3-dioxolane hydrochloride (alpha racemate) melting at 218–219.5°.

Analysis.—Calculated for $C_{22}H_{27}NO_3 \cdot HCl$: C, 67.76; H, 7.24; Cl, 9.09. Found: C, 67.81; H, 6.88; Cl, 8.86.

This compound is a spasmolytic, local anesthetic and an anti-convulsant.

Example 45.—4-(1-chloroacetyl-2-piperidyl)-2,2-diphenyl-1,3-dioxolane, alpha racemate Following the procedure described in Example 36, 2,2-diphenyl-4-(2-piperidyl)-1,3-dioxolane hydrochloride (alpha racemate from Example 3) was reacted with caustic and chloroacetyl chloride and the crude product was recrystallized from benzene-ether and then from benzene to give 4-(1-chloroacetyl-2-piperidyl)-2,2-diphenyl-1,3-dioxolane (alpha racemate) melting at 126.5–127.5°.

Analysis.—Calculated for $C_{22}H_{24}ClNO_3$: C, 68.47; H, 6.27; Cl, 9.19. Found: C, 68.37; H, 6.06; Cl, 9.31.

This compound is an intermediate for the preparation of the compound described in Example 48.

Example 46.—4-(1-chloroacetyl-2-piperidyl)-2,2-diphenyl-1,3-dioxolane, beta racemate Following the procedure described in Example 36, 72 grams of 2,2-diphenyl-4-(2-piperidyl)-1,3-dioxolane hydrochloride (beta racemate from Example 4) was reacted with 35 grams of chloroacetyl chloride and the product crystallized upon evaporation of the ethylene dichloride. The crude product was recrystallized from benzene to give 4 - (1-chloroacetyl-2-piperidyl)-2,2-diphenyl-1,3-dioxolane (beta racemate) melting at 153–154°.

Analysis.—Calculated for $C_{22}H_{24}ClNO_3$: C, 68.47; H, 6.27; Cl, 9.19. Found: C, 68.65; H, 6.21; Cl, 9.02.

This compound is an intermediate for the preparation of the compound described in Example 47.

Example 47.—4-(1-diethylaminoacetyl-2-piperidyl)-2,2-diphenyl-1,3-dioxolane hydrochloride, beta racemate In 100 milliliters of benzene, 18 grams of 4-(1-chloroacetyl-2-piperidyl)-2,2-diphenyl-1,3-dioxolane, from Example 46, and 7.2 grams of diethylamine were reacted at reflux for three hours. The reaction mixture was extracted with water, dried over potassium carbonate and evaporated to an oily residue. The oil was taken up in benzene and sufficient dry hydrogen chloride in isopropanol added to neutralize the product. Adding pentane gave a precipitate which was amorphous, but became crystalline upon stirring. The crude product was recrystallized from ethyl acetate and then from isopropanol-ethyl acetate to give 4-(1-diethylaminoacetyl-2-piperidyl)-2,2-diphenyl-1,3-dioxolane hydrochloride (beta racemate) melting at 175–176°.

Analysis.—Calculated for $C_{26}H_{34}N_2O_3 \cdot HCl$: C, 68.03; H, 7.69; N, 6.10. Found: C, 68.22; H, 7.64; N, 6.26.

This compound is a spasmolytic and local anesthetic.

Example 48.—4 - (1-diethylaminoacetyl-2-piperidyl)-2,2-diphenyl-1,3-dioxolane hydrochloride, alpha racemate Following the procedure used in Example 47, 32 grams of 4-(1-chloroacetyl-2-piperidyl)-2,2-diphenyl-1,3-dioxolane from Example 45 was reacted with 24 grams of diethylamine to give an amorphous precipitate which was crystallized by stirring in ethyl acetate. It was recrystallized from isopropanol-ethyl acetate to give 4-(1-diethylaminoacetyl - 2-piperidyl)-2,2-diphenyl-1,3-dioxolane hydrochloride (alpha racemate) melting at 182–183°.

Analysis.—Calculated for $C_{26}H_{34}N_2O_3 \cdot HCl$: C, 68.03; H, 7.69; N, 6.10. Found: C, 68.47; H, 7.73; N, 6.34.

This compound is a spasmolytic and local anesthetic.

*Example 49.—4-[1-(2-diethylaminoethyl)-2-piperidyl]-2, 2-diphenyl-1,3-dioxolane hydrochloride, beta racemate*

In a dry flask with condenser and dropping funnel and protected by drying tubes was placed 100 milliliters of dry ether and 1.28 grams of lithium aluminum hydride. While stirring the suspension, 17.3 grams of 4-(1-diethylaminoacetyl-2-piperidyl) - 2,2 - diphenyl - 1,3 - dioxolane (from Example 47) in 100 milliliters of dry ether was added during a two hour period with vigorous stirring. The mixture was then refluxed for two hours and 25 milliliters of water was added. The separated ether phase was dried over potassium carbonate and evaporated to an oil. The oil, dissolved in benzene, was treated with 1.2 grams of hydrogen chloride in isopropanol and a small precipitate was separated leaving a filtrate which was evaporated in vacuo to an amorphous solid. The solid was crystallized by heating with benzene and was then recrystallized from isopropanol-ethyl acetate and finally crystallized from acetone to give 4-[1-(2-diethylaminoethyl)-2-piperidyl]-2,2-diphenyl-1,3 - dioxolane dihydrochloride (beta racemate) melting at 180°.

*Analysis.*—Calculated for $C_{26}H_{36}N_2O_2 \cdot 2HCl$: C, 64.85; H, 7.95; N, 5.82. Found: C, 64.70; H, 7.68; N, 6.19.

This compound is a spasmolytic and local anesthetic.

*Example 50.—2,2-diphenyl-4-(4-piperidyl)1,3-dioxolane hydrochloride*

To 100 grams of 4-pyridylmethanol and 28 grams of paraformaldehyde in 100 milliliters of water was added 2 milliliters of 10 percent sodium hydroxide and this solution was refluxed 20 hours. The solution was cooled, acidified with 6 N hydrochloric acid to pH 4. The water was removed under vacuum at steam bath temperatures and the viscous sirupy residue was diluted with isopropanol from which crystals were isolated which melted at 90–150° C. These were chiefly a mixture of 4-pyridyl-1,2-ethanediol hydrochloride and the hydrochloride of unreacted 4-pyridylmethanol. A mixture of 122 grams of these crystals and 190 grams of dimethoxydiphenylmethane in 300 milliliters of isopropanol and 200 milliliters of ethanol was heated to reflux and acidified with ethanolic hydrogen chloride. After refluxing 16 hours, the solvents were removed under vacuum, the residue was triturated with anhydrous ether and the ether extract was discarded. The viscous residue was extracted three times with 500 milliliter portions of hot chloroform, the combined extracts were concentrated to 200 milliliters and diluted with 50 milliliters of anhydrous ether to give 42 grams of crystals, melting at 185–200° C. These were recrystallized from ethanol to give 27 grams of 2,2-diphenyl-4-(4-pyridyl)-1,3 - dioxolane hydrochloride, melting at 211.5–214°.

*Analysis.*—Calculated for $C_{20}H_{17}NO_2 \cdot HCl$: C, 70.70; H, 5.34; N, 4.12. Found: C, 70.20; H, 5.56; N, 4.24.

A suspension of 25 grams of 2,2-diphenyl-4-(4-pyridyl)-1,3-dioxolane hydrochloride in 150 milliliters of ethanol containing 0.4 gram of platinum oxide was hydrogenated, beginning at 60 p.s.i. until three molar equivalents of hydrogen were absorbed. The suspension was diluted with 100 milliliters of methanol and warmed to give a solution which was filtered. The filtrate was concentrated to 100 milliliters by evaporation and diluted with about 40 milliliters of ether. The product then precipitated and was recrystallized from methanol-ether to give 21.4 grams of 2,2-diphenyl-4-(4-piperidyl)-1,3-dioxolane hydrochloride, melting at 209.1–211.7°.

*Analysis.*—Calculated for $C_{20}H_{23}NO_2 \cdot HCl$: C, 69.45; H, 6.99; N, 4.05; Cl, 10.25. Found: C, 69.50; H, 7.20; N, 4.08; Cl, 10.15.

This compound is a local anesthetic and inhibits the hydrolysis of triglycerides by pancreatic lipase.

*Example 51.—4-(1-methyl-4-piperidyl)-2,2-diphenyl-1,3-dioxolane hydrochloride*

Following the procedure of Example 30, 2,2-diphenyl-4-(4-piperidyl) - 1,3 - dioxolane hydrochloride (Example 50) was reductively methylated to give a crude product which was recrystallized from methanol to give white crystals of 4-(1-methyl-4-piperidyl)-2,2-diphenyl-1,3-dioxolane hydrochloride, melting at about 234.5–236°.

*Analysis.*—Calculated for $C_{21}H_{25}NO_2 \cdot HCl$: C, 70.08; H, 7.28; N, 3.89. Found: C, 70.04; H, 7.60; N, 3.85.

This compound is a spasmolytic, local anesthetic, an anti-convulsant and inhibits the hydrolysis of triglycerides by pancreatic lipase. It also has marked anti-anxiety activity.

*Example 52.—2-(2-piperidyl)-1,4-dioxaspiro[4.5]-decane hydrochloride*

39 grams of 2-piperidyl-1,2-ethanediol hydrochloride and 43 grams of cyclohexanone were dissolved in 150 milliliters of isopropanol and sufficient dry hydrogen chloride gas was admitted beneath the surface to acidify the reaction mixture. The solution was allowed to stand at room temperature (the reaction may be accelerated by heating on the steam bath) for several days. The crystalline precipitate was separated and recrystallized from isopropanol to give 9.2 grams of 2-(2-piperidyl)-1,4-dioxaspiro[4.5]decane hydrochloride, melting at 223°.

*Analysis.*—Calculated for $C_{13}H_{23}NO_2 \cdot HCl$: C, 59.64; H, 9.24; N, 5.35. Found: C, 59.50; H, 9.05; N, 5.58.

This compound is a spasmolytic.

*Example 53.—6-methyl-2-(2-piperidyl)-1,4-dioxaspiro-[4.5]decane hydrochloride*

Following the procedure of Example 52, using an equal molar amount of 2-methylcyclohexanone in place of cyclohexanone, 6-methyl-2-(2 - piperidyl) - 1,4 - dioxaspiro-[4.5]decane hydrochloride was obtained, melting at 247–250°.

*Analysis.*—Calculated for $C_{14}H_{25}NO_2 \cdot HCl$: C, 60.96; H, 9.50; N, 5.08. Found: C, 60.62; H, 9.31; N, 5.01.

This compound is a spasmolytic, local anesthetic and an anti-convulsant.

*Example 54.—6-ethyl-2-(2-piperidyl)-1,4-dioxaspiro-[4.5]decane hydrochloride*

Following the procedure of Example 52 and using an equal molar quantity of 2-ethylcyclohexanone in place of cyclohexanone, 6-ethyl-2-(2-piperidyl)-1,4-dioxaspiro-[4.5]decane hydrochloride was obtained, melting at 263°.

*Analysis.*—Calculated for $C_{15}H_{27}NO_2 \cdot HCl$: C, 62.15; H, 9.74; N, 4.83. Found: C, 61.92; H, 9.56; N, 5.01.

This compound is a spasmolytic and local anesthetic.

*Example 55.—7-methyl-2-(2-piperidyl)-1,4-dioxaspiro-[4.5]decane hydrochloride*

Following the procedure of Example 52, using an equal molar quantity of 3-methylcyclohexanone in place of cyclohexanone, 7-methyl-2-(2 - piperidyl) - 1,4 - dioxaspiro-[4.5]decane hydrochloride was obtained, melting at 232–233°.

*Analysis.*—Calculated for $C_{14}H_{25}NO_2 \cdot HCl$: C, 60.96; H, 9.50; N, 5.08. Found: C, 60.80; H, 9.76; N, 5.01.

This compound is a spasmolytic and local anesthetic.

*Example 56.—8-methyl-2-(2-piperidyl)-1,4-dioxaspiro-[4.5]decane hydrochloride*

Following the procedure of Example 52 and using an equal molar quantity of 4-methylcyclohexanone in place of cyclohexanone, 8-methyl-2-(2 - piperidyl) - 1,4 - dioxaspiro[4.5]decane hydrochloride was obtained melting at 258°.

*Analysis.*—Calculated for $C_{14}H_{25}NO_2 \cdot HCl$: C, 60.96; H, 9.50; N, 5.08. Found: C, 60.68; H, 9.25; N, 5.04.

This compound is a spasmolytic and local anesthetic.

*Example 57.—7,9-dimethyl-2-(2-piperidyl)-1,4-dioxaspiro[4.5]decane hydrochloride*

Following the procedure of Example 52 and using an equal molar quantity of 3,5-dimethylcyclohexanone in place of cyclohexanone, 7,9-dimethyl-2-(2-piperidyl)-1,4-dioxaspiro[4.5]decane hydrochloride was obtained, melting at 219–220°.

*Analysis.*—Calculated for $C_{15}H_{27}NO_2 \cdot HCl$: C, 62.15; H, 9.74; N, 4.83. Found: C, 62.04; H, 9.77; N, 4.95.

This compound is a spasmolytic and local anesthetic.

*Example 58.—8-tert-butyl-2-(2-piperidyl)-1,4-dioxaspiro[4.5]decane hydrochloride*

Following the procedure for Example 52 and using an equal molar quantity of 4-tert-butylcyclohexanone in place of cylohexanone, 8-tert-butyl-2-(2-piperidyl)-1,4-dioxaspiro[4.5]decane hydrochloride was obtained (from ethanol) melting at 264–265°.

*Analysis.*—Calculated for $C_{17}H_{31}NO_2 \cdot HCl$: C, 64.22; H, 10.15; N, 4.41. Found: C, 63.94; H, 9.44; N, 4.87.

This compound is a spasmolytic, local anesthetic and an anti-convulsant.

*Example 59.—6-chloro-2-(2-piperidyl)-1,4-dioxaspiro-[4.5]decane hydrochloride*

Following the procedure of Example 52 and using an equal molar quantity of 2-chlorocyclohexanone in place of cyclohexanone, 6-chloro-2-(2-piperidyl)-1,4-dioxaspiro-[4.5]decane hydrochloride was obtained, melting at 235–237°.

*Analysis.*—Calculated for $C_{13}H_{22}ClNO_2 \cdot HCl$: C, 52.70; H, 7.82; N, 4.73. Found: C, 52.74; H, 7.89; N, 4.95.

This compound is a spasmolytic and an anti-convulsant.

*Example 60.—8-chloro-2-(2-piperidyl)-1,4-dioxaspiro-[4.5]decane hydrochloride, alpha racemate*

Following the procedure of Example 52, 26.6 grams of 4-chlorocyclohexanone and 36 grams of the alpha racemate of (2-piperidyl)1,2-ethanediol hydrochloride (from Preparation 14) were reacted to give a crude product which was recrystallized from ethanol to give 8-chloro-2-(2 - piperidyl)-1,4-dioxaspiro[4,5]decane hydrochloride (alpha racemate), melting at 239° (d.).

*Analysis.*—Calculated for $C_{13}H_{22}ClNO_2 \cdot HCl$: C, 52.71; H, 7.83; Cl, 23.94. Found: C, 52.65; H, 7.67; Cl, 23.78.

This compound is a spasmolytic.

*Example 61.—8-chloro-2-(2-piperidyl)-1,4-dioxaspiro-[4.5]decane hydrochloride, beta racemate*

Following the procedure of Example 60, and using the beta racemate of (2-piperidyl)-1,2-ethanediol hydrochloride (Preparation 15) 8-chloro-2-(2-piperidyl)-1,4-dioxaspiro[4.5]decane hydrochloride (beta racemate) was isolated and recrystallized from isopropanol-ether. It melted at 206–207°.

*Analysis.*—Calculated for $C_{13}H_{22}ClNO_2 \cdot HCl$: C, 52.71; H, 7.83; Cl, 23.94. Found: C, 53.39; H, 8.09, Cl, 24.15.

This compound is an anti-convulsant.

*Example 62.—2-(2-piperidyl)-1,4-dioxaspiro[4.6]-undecane hydrochloride*

Following the procedure of Example 52 and using an equal molar quantity of cycloheptanone in place of cyclohexanone 2 - (2 - piperidyl)-1,4-dioxaspiro[4.6]undecane hydrochloride was obtained, melting at 220–223° when recrystallized from isopropanol by acetone dilution.

*Analysis.*—Calculated for $C_{14}H_{25}NO_2 \cdot HCl$: C, 60.96; H, 9.50; N, 5.08. Found: C, 60.83; H, 9.38; N, 5.29.

This compound is an anti-convulsant.

*Example 63.—8-methyl-8-phenyl-2-(2-piperdyl)-1,4-dioxaspiro[4.5]decane hydrochloride*

A solution of 0.05 mole of 2-piperidyl-1,2-ethanediol hydrochloride plus 0.05 mole of 4-methyl-4-phenylcyclohexanone in 30 milliliters of isopropanol was acidified with a little hydrogen chloride gas and let stand at room temperature for six weeks. The solvent was distilled off and the thick oily residue was dissolved in 50 milliliters of hot benzene and refluxed for several hours while dry hydrogen chloride gas was passed into it. After approximately 0.05 mole of water had been collected in a Dean-Stark trap the solvent was removed and the residual oil was allowed to stand at room temperature for five months until crystals had formed. The product was made alkaline with 40 milliliters of 25 percent aqueous potassium hydroxide and extracted with three 50-milliliter portions of ether. The combined ethereal extracts were dried over anhydrous magnesium sulfate, concentrated to a volume of 30 milliliters and acidified with 12.5 milliliters (0.041 mole) of 3.3 molar dry hydrogen chloride in anhydrous ether. The precipitated oil was seeded and soon crystallized, to yield, after washing and drying; 18 grams of crude product. This was crystallized from 18 milliliters of isopropanol to yield 6.20 grams, melting at 193—213°; recrystallization from 16 milliliters of methanol plus 32 milliliters of ether yielded 4.30 grams (24 percent of the theoretical yield) of 8 - methyl - 8 - phenyl-2-(2-piperidyl)-1,4-dioxaspiro[4.5] decane hydrochloride, melting at 215–230°.

*Analysis.*—Calculated for $C_{20}H_{29}NO_2 \cdot HC$: C, 68.26; H, 8.59; N, 3.98. Found: C, 68.53; H, 8.34; N, 4.40.

This compound is a spasmolytic, local anesthetic and an anti-convulsant.

*Example 64.—8-methyl-8-phenyl-2-(2-piperidyl)-1,4-dioxaspiro[4.5]decane hydrochloride, alpha racemate*

A mixture of 20.00 grams of the beta racemate of 2-piperidyl-1,2-ethanediol hydrochloride (Preparation 15) and 20.71 grams of 4-methyl-4-phenylcyclohexanone in 100 milliliters of isopropanol was acidified with 0.01 mole of dry hydrogen chloride in ether and heated on a steam bath until the ether had distilled out. The residue was refluxed for four hours and let stand overnight; the alcohol was distilled and the syrupy residue was refluxed with 100 milliliters of benzene under a Dean-Stark trap for 95 hours until 1.7 milliliters of lower liquid phase had been collected. The solvent was distilled under vacuum and the crystalline residue was slurried with dry ether, washed and dried to yield crude product. This was recrystallized four times from 1:2 methanol-ether to give 8-methyl-8-phenyl-2-(2-piperidyl)-1,4-dioxaspiro[4.5]decane hydrochloride (alpha racemate), melting at 244–252°.

*Analysis.*—Calculated for $C_{20}H_{29}NO_2 \cdot HCl$: C, 68.26; H, 8.59; Cl, 10.08. Found: C, 68.19; H, 8.71; Cl, 10.32.

This compound is a spasmolytic, local anesthetic and an anti-convulsant.

*Example 65.—8-methyl-8-phenyl-2-(2-piperidyl)-1,4-dioxaspiro[4.5]decane hydrochloride, beta racemate*

From the mother liquors in Example 64 was obtained the beta racemate of 8-methyl-8-phenyl-2-(2-piperidyl)-1,4-dioxaspiro[4.5]decane hydrochloride, melting at 202–219°.

*Analysis.*—Calculated for $C_{20}H_{29}NO_2 \cdot HCl$: C, 68.26; H, 8.59; Cl, 10.08. Found: C, 68.09; H, 8.49; Cl, 10.21.

*Example 66.—8,8-diphenyl-2-(2-piperidyl)-1,4-dioxaspiro[4.5]decane hydrochloride, beta racemate*

A mixture of 10.00 grams of 2-piperidyl-1,2-ethanediol hydrochloride (Preparation 15) and 13.8 grams of 4,4-diphenylcyclohexanone in 150 milliliters of isopropanol plus 2 milliliters of 5 M dry hydrogen chloride in ether was heated to distill off the ether and then refluxed for 18 hours. Most of the solvent was distilled from a steam bath and the residue was refluxed under a Dean-Stark trap with 100 milliliters of benzene overnight. The solvent was distilled and the crystalline residue was hot extracted from a Soxhlet thimble into methanol and let stand at room temperature to crystallize. This crystallization was repeated once more to give 8,8-diphenyl-2-(2-piperidyl)-1,4-dioxaspiro[4.5]decane hydrochloride (beta racemate), melting at 277–285°.

*Analysis.*—Calculated for $C_{25}H_{31}NO_2 \cdot HCl$: C, 72.53; H, 7.79; Cl, 8.56. Found: C, 72.37; H, 7.91; Cl, 8.66.

*Example 67.—4-(2-piperidyl)-spiro(1,3-dioxolane-2,9'-fluorene)hydrochloride*

Following the procedure of Example 2, 22.6 grams of 9,9-dimethoxyfluorene and 18.1 grams of 2-piperidyl-1,2-ethanediol hydrochloride were condensed and after crystallization from isopropanol gave 7.6 grams of 4-(2-piperidyl)-spiro(1,3-dioxolane-2,9'-fluorene)hydrochloride decomposing at 275°.

*Analysis.*—Calculated for $C_{20}H_{21}NO_2 \cdot HCl$: C, 69.86; H, 6.45; N, 4.07. Found: C, 69.82; H, 6.54; N, 4.34.

This compound is a spasmolytic and an anti-convulsant.

*Example 68.—4-(2-piperidyl)-spiro(1,3-dioxolane-2,9'-fluorene)hydrochloride, alpha racemate*

Following the procedure of Example 12, except that reaction was conducted at room temperature, 22.2 grams of 9,9-dimethoxyfluorene and 14.5 grams of 2-piperidyl-1,2-ethanediol hydrochloride (Preparation 14) were suspended in 150 milliliters of isopropanol and sufficient dry hydrogen chloride gas was added to the solution to give an acid reaction medium. After four days with intermittent stirring, the reaction mixture was filtered and the crude product was recrystallized from isopropanol to give 4-(2-piperidyl)-spiro(1,3-dioxolane-2,9'-fluorene)hydrochloride (alpha racemate), melting at 284–285°.

*Analysis.*—Calculated for $C_{20}H_{21}NO_2 \cdot HCl$: C, 69.86; H, 6.45; Cl, 10.31. Found: C, 69.82; H, 6.69; Cl, 10.08.

This compound is a spasmolytic, local anesthetic and an anti-convulsant.

*Example 69—4-(2-piperidyl)-spiro(1,3-dioxolane-2,9'-fluorene)hydrochloride, beta racemate*

Following the procedure of Example 12, 22.2 grams of 9,9-dimethoxyfluorene and 18.1 grams of 2-piperidyl-1,2-ethanediol hydrochloride (Preparation 15) were reacted together and the crude product was recrystallized from methanol and then from ethanol to give 4-(2-piperidyl)-spiro(1,3-dioxolane-2,9'-fluorene)hydrochloride (beta racemate), melting at 258–259°, a spasmolytic and an anti-convulsant.

*Analysis.*—Calculated for $C_{20}H_{21}NO_2 \cdot HCl$: C, 69.86; H, 6.45; Cl, 10.31. Found: C, 69.71; H, 6.31; Cl, 10.25.

*Example 70.—4-(1-methyl-2-piperidyl)-2,2-diphenyl-1,3-dioxolane N-oxide hydrochloride, alpha and beta racemates*

Following the procedure of Example 5, 10 grams of 4-(1-methyl-2-piperidyl)-2,2-diphenyl-1,3-dioxolane hydrochloride (Example 31) was converted to 9.5 grams of free base which was dissolved in methanol containing 14 milliliters of 30 percent hydrogen peroxide in water. After two weeks the reaction mixture was filtered and the filtrate evaporated in vacuo. The residue was dissolved in methanol, treated with platinum oxide to decompose the excess hydrogen peroxide, refiltered and evaporated to a solid which was recrystallized from ethyl acetate containing a trace of methanol. The product was dissolved in dry methanol-ethyl acetate and reprecipitated as the hydrochloride salt by adding hydrogen chloride in isopropanol. The precipitate was recrystallized from butanol and then ethanol to give 4-(1-methyl-2-piperidyl)-2,2-diphenyl-1,3-dioxolane N-oxide hydrochloride (beta racemate), which decomposed at 200° C.

*Analysis.*—Calculated for $C_{21}H_{25}NO_3 \cdot HCl$: C, 67.10; H, 6.97; Cl, 9.43. Found: C, 67.20; H, 7.15; Cl, 9.56.

This compound is an anti-fibrillatory agent and a parasympathetic blocking agent.

Following the above procedure, 15.1 grams of 4-(1-methyl-2-piperidyl)-2,2-diphenyl-1,3-dioxolane, alpha racemate (Example 30) was converted to the N-oxide which crystallized from ether. The hydrochloride was prepared by the addition of hydrogen chloride in isopropanol to the free base in acetone. Diluting with ether gave a crystalline precipitate which was recrystallized from acetone. Prolonged drying under vacuum at 55° gave 4-(1-methyl-2-piperidyl)-2,2-diphenyl-1,3-dioxolane N-oxide hydrochloride as the acetone solvate melting at 113°.

*Analysis.*—Calculated for $C_{21}H_{25}NO_3 \cdot HCl \cdot C_3H_6O$: C, 66.42; H, 7.43; N, 3.23; Cl, 8.17. Found: C, 65.89; H, 7.48; N, 3.34; Cl, 8.88.

*Example 71.—4-(1-benzyl-2-piperidyl)-2,2-diphenyl-1,3-dioxolane N-oxide hydrochloride, alpha racemate*

Following the procedure of Example 70, 13.9 grams of 4-(1-benzyl-2-piperidyl)-2,2-diphenyl-1,3-dioxolane (alpha racemate) (Example 40), was converted to amorphous N-oxide which was recrystallized by stirring several hours with dry ether. The precipitate was filtered, dissolved in acetone containing a small amount of isopropanol and the hydrochloride was precipitated by adding dry hydrogen chloride in isopropanol. Two recrystallizations from acetone-isopropanol gave 2.5 grams of 4-(1-benzyl-2-piperidyl)-2,2-diphenyl-1,3-dioxolane N-oxide hydrochloride, melting at 191° (d.).

*Analysis.*—Calculated for $C_{27}H_{29}NO_3 \cdot HCl$: C, 71.75; H, 6.69; Cl, 7.84. Found: C, 71.65; H, 6.73; Cl, 7.79.

*Example 72.—(+)-4-(1-allyl-2-piperidyl)-2,2-diphenyl-1,3-dioxolane hydrochloride, from the alpha racemate*

Following the procedure of Example 40, the oily free base, (+)-2,2-diphenyl-4-(2-piperidyl)-1,3-dioxolane (Example 9) was reacted with allyl bromide and the oily product was converted to the hydrochloride which was recrystallized from isopropanol to give (+)-4-(1-allyl-2-piperidyl)-2,2-diphenyl-1,3-dioxolane hydrochloride, melting at 198.5–199.5°, $\alpha_D^{22}$ (+)9.0° (1 percent in methanol).

*Analysis.*—Calculated for $C_{23}H_{27}NO_2 \cdot HCl$: C, 71.58; H, 7.31; Cl, 9.19. Found: C, 71.52; H, 7.59; Cl, 9.12.

This compound is a spasmolytic, local anesthetic and a parasympathetic blocking agent.

*Example 73.—2,2-dihexyl-4-(2-piperidyl)-1,3-dioxolane hydrochloride, alpha racemate*

Following the procedure of Example 12, 18.1 grams of 2-piperidyl-1,2-ethanediol hydrochloride (alpha racemate) was reacted with 30 grams of dihexyldipropoxymethane and the reaction solvent was removed in vacuo to give an amorphous solid which was triturated with ether at reflux temperature to give a crystalline precipitate. The crude product was recrystallized from a concentrated solution in isopropanol by dilution with ethyl acetate and then digested with pentane at reflux temperature and finally recrystallized from acetone twice to give 2,2-dihexyl-4-(2-piperidyl)-1,3-dioxolane hydrochloride (alpha racemate), melting at 153–155°.

*Analysis.*—Calculated for $C_{20}H_{39}NO_2 \cdot HCl$: C, 66.36; H, 11.14; N, 3.87. Found: C, 66.85; H, 11.29; N, 3.94.

This compound inhibits the hydrolysis of triglycerides by pancreatic lipase.

The dihexyldipropoxymethane, prepared by the procedure described in the last part of Example 12 from dihexylketone, boiled at 125–126° (3 mm.).

*Example 74.—2,2-dihexyl-4-(2-piperidyl)-1,3-dioxolane hydrochloride, beta racemate*

Using the beta racemate of 2-piperidyl-1,2-ethanediol hydrochloride in the procedure of Example 73, the beta racemate of 2,2-dihexyl-4-(2-piperidyl)-1,3-dioxolane hydrochloride was obtained, melting at 132–133°.

*Analysis.*—Calculated for $C_{20}H_{39}NO_2 \cdot HCl$: C, 66.36; H, 11.14; Cl, 9.79. Found: C, 66.22; H, 11.25; Cl, 9.92.

This compound inhibits the hydrolysis of triglycerides by pancreatic lipase.

*Example 75.—2,2-dioctyl-4-(2-piperidyl)-1,3-dioxolane hydrochloride, alpha racemate*

A mixture of 29.3 grams of dioctyldipropoxymethane and 35 milliliters of dry propanol, containing 15.7 grams of (2-piperidyl)-1,2-ethanediol hydrochloride (alpha racemate) formed two liquid phases. It was heated on the steam bath and 0.09 grams of dry hydrogen chloride was added with stirring and the liquid phases combined immediately. After heating for 30 minutes the solvent was removed at reduced pressure, leaving a waxy solid which was triturated with pentane to give the crude product weighing 29.2 grams. It was recrystallized from acetone to give 23.7 grams which was neutralized with 25 milliliters of 20 percent sodium hydroxide, extracted into ether, evaporated to an oil, and dissolved in 100 milliliters dry benzene. This solution was neutralized with 2.06 grams of hydrogen chloride in 11 milliliters of propanol. The benzene was diluted with 200 milliliters of pentane and allowed to stand for several hours at 2° when a crop of 7.5 grams of crude product was separated. The mother liquor was evaporated to a sirup and treated with 400 milliliters of pentane at reflux while adding a few drops of propanol to secure solution of all the sirup. After chilling 8.7 grams of 2,2-dioctyl-4-(2-piperidyl)-1,3-dioxolane hydrochloride (alpha racemate) was obtained, melting at 105–112°.

*Analysis.*—Calculated for $C_{24}H_{47}NO_2 \cdot HCl$: C, 68.95; H, 11.57; Cl, 8.48. Found: C, 69.00; H, 11.36; Cl, 8.75.

This compound inhibits the hydrolysis of triglycerides by pancreatic lipase.

The dioctyldipropoxymethane, prepared by the procedure described in the last part of Example 12 from dioctylketone, boiled at 164–165° (0.5 mm.), $n_D^{27}=1.4499$.

*Example 76.—2,2-dibutyl-4-(2-piperidyl)-1,3-dioxolane hydrochloride alpha racemate*

36.4 grams of 2-piperidyl-1,2-ethanediol hydrochloride, (alpha racemate) in 200 milliliters of isopropanol was refluxed with 66 grams of dibutyldipropoxymethane in the presence of 0.5 gram of hydrogen chloride for 2.5 hours. The solvent was removed and the residue was treated as described for the purification of Example 75 by preparing the free base and reprecipitating the hydrochloride which was recrystallized from 450 milliliters of acetone to give 43.5 grams of 2,2-dibutyl-4-(2-piperidyl)-1,3-dioxolane hydrochloride (alpha racemate) melting at 160.5–162°.

*Analysis.*—Calculated for $C_{16}H_{31}NO_2 \cdot HCl$: C, 62.82; H, 10.54; N, 4.60. Found: C, 62.83; H, 10.55; N, 4.71.

This compound inhibits the hydrolysis of triglycerides by pancreatic lipase.

The dibutyldipropoxymethane, prepared by the procedure described in the last part of Example 12 from dibutylketone, boiled at 116–122° C., at 12 mm., $n_D^{27}=1.4285$.

*Example 77.—2,2-dihexyl-4-(1-methyl-2-piperidyl)-1,3-dioxolane hydrochloride, alpha racemate*

A mixture of 41 grams of 2,2-dihexyl-4-(2-piperidyl)-1,3-dioxolane hydrochloride (alpha racemate) (Example 73) and 45 grams of formalin (37 percent) in 400 milliliters of methanol containing 6 grams of 10 percent palladium on carbon was shaken under a hydrogen atmosphere of 58 p.s.i. After the theoretical amount of hydrogen had been consumed, the solution was filtered and the solvent and excess formalin were removed under reduced pressure. Residual water was removed by adding isopropanol and removing under reduced pressure on the steam bath. A solution of the viscous residue in ethyl acetate was diluted with pentane and a crystalline product formed slowly. This material was recrystallized from the same solvent pair to give the alpha racemate of 2,2-dihexyl-4-(1-methyl-2-piperidyl)-1,3-dioxolane hydrochloride, melting at 106°

*Analysis.*—Calculated for $C_{21}H_{41}NO_2 \cdot HCl$: C, 67.08; H, 11.26; Cl, 9.43. Found: C, 67.12; H, 11.44; Cl, 9.46.

This compound inhibits the hydrolysis of triglycerides by pancreatic lipase.

*Example 78.—2-(2,2-dihexyl-1,3-dioxolan-4-yl)-1,1-dimethyl-piperidinium iodide, alpha racemate*

A mixture of 7.6 grams of 2,2-dihexyl-4-(1-methyl-2-piperidyl)-1,3-dioxolane hydrochloride (from Example 77) and 1.06 grams of sodium methylate in 50 milliliters of ethanol was stirred for an hour and filtered. Fourteen grams of methyl iodide were added to the filtrate and the solution was refluxed for 30 minutes. The solvent was removed and the residue stirred in pentane to give the alpha racemate of 2-(2,2-dihexyl-1,3-dioxolan-4-yl)-1,1-dimethylpiperidinium iodide, melting at 113–116°.

*Analysis.*—Calculated for $C_{22}H_{44}INO_2$: C, 54.88; H, 9.21; I, 26.36. Found: C, 55.20; H, 9.42; I, 26.9.

This compound is spasmolytic.

When the compositions of this invention are used as pharmaceuticals, they can be administered orally in the form of pills, tablets, capsules, e.g., in admixture with talc, starch, sugar, milk sugar, or other inert, i.e., non-toxic or pharmacologically acceptable pharmaceutical carrier, or in the form of aqueous solutions, suspensions, encapsulated suspensions, gels, elixirs, aqueous alcoholic solutions, e.g., in admixture with sugar or other sweetening agent, flavorings, colorants, thickeners, and other conventional pharmaceutical excipients. When injected subcutaneously, intravenously or intramuscularly, usually the latter, they can be administered, e.g., as an aqueous or peanut oil solution or suspension using excipients and carriers conventional for this mode of administration. The best route of administration and the best dosage will be apparent from the laboratory tests for activity and toxicity of the selected compound conventionally undertaken as part of the development phase of a pharmaceutical.

The $LD_{50}$ toxicity in laboratory test animals will usaully range from about 150 to 1,000 mg./kg. orally and about 10 to 150 mg./kg. intraveneously.

Of the compounds described above, of particular interest is 2,2-diphenyl-4-(2-piperidyl)-1,3-dioxolane hydrochloride and its various steroisomeric modifications. This compound, in addition to its antispasmodic effects, has the unusual attribute in vivo of blocking parasympathetic impulses but does not interfere with the response to acetylcholine. This activity appears to be the result of a specific block of parasympathetic ganglia not mediated through inhibition or antagonism of acetylcholine. In addition to its spasmolytic activity on the intestinal tract, intravenous administration of this compound to anesthetized bilaterally vagotomized dogs increased coronary and peripheral blood flow thereby further demonstrating its direct smooth muscle relaxant properties. The compound also exhibits local anesthetic properties. The alpha-racemate of 2,2-diphenyl-4-(2-piperidyl)-1,3-dioxolane exhibits significant central nervous system depressant activity. When this alpha-racemate is resolved into its dextrorotatory and levorotatory isomers, all of the central nervous system depressant activity is found in the dextrorotatory isomer and none of that activity is found in the levorotatory isomer.

A class of compounds having useful anti-pancreatic lipase activity and otherwise structurally corresponding to the 2-carbocyclic compounds of this invention are those in which the 2-position carbon atom of the dioxolane ring is substituted with two alkyl groups each containing from 4 to 16 carbon atoms. Those compounds in which the alkyl groups have from 4 to 8 carbon atoms each have particularly pronounced activity. Surprisingly, the corresponding dialkyl compounds in which each alkyl group contains less than 4 carbon atoms are substantially devoid of this activity as are the 2-carbocyclic compounds of this invention.

The inhibition of pancreatic lipase inhibits the absorption of triglycerides from the intestinal tract and thus causes a diminution of postprandial hyperlipemia. This activity is desirable in the treatment of cardiovascular diseases and obesity. Pancreatic lipase inhibition can be measured in vitro by observing the effect of compounds on the lipase (steapsin) catalyzed hydrolysis of triglycerides when emulsified with sodium cholate in an artificial intestinal mixture using standard conditions of pH, temperature, and time. A compound is considered to have marked lipase inhibiting activity when 200 mg. will cause a greater than 50 percent inhibition of lipolysis in a system of 100 ml. containing 1 gram cottonseed oil and 60 mg. of steapsin held for 1 hour at pH 7.0 and 38° C.

Compounds which can be prepared by the methods described herein or alternate techniques obvious to those skilled in the art are those in which the 2-cyclic substituted dioxolane structure described herein have as its 4-position substituent a 2-pyrrolidyl-, 3-pyrrolidyl-, 2-morpholinyl-, 2-piperazinyl, 2-hexahydropyrimidinyl, 2-imidazolinyl, the corresponding N-methyl and other N-lower alkyl heterocyclics and other non-aromatic heterocyclic ring systems attached by a ring carbon atom to the dioxolane ring and containing one or more ring nitrogen atoms. These compounds, while not part of the present invention, have similar but not equivalent utility, especially by virtue of their pharmacological activity. They can, of course, be utilized as intermediates for the preparation of other compounds by virtue of their amino nitrogen atoms and can be used as rubber accelerators.

What is claimed is:

1. A 1,3-dioxolane having at the 4-position a piperidine ring bonded directly thereto by a ring carbon atom of the piperidine ring and at the 2-position a non-acidic, non-basic, non-nitrogenous neutral cyclic structure having a molecular weight less than 300 and containing up to 3 rings of which one is a carbocyclic ring in which the 2-position carbon atom of the dioxolane ring is a ring carbon atom thereof or is in carbon-to-carbon linkage therewith.

2. A compound according to claim 1 wherein the cyclic structure contains at least one benzene ring separated by no more than one carbon atom from the 2-position carbon atom of the dioxolane ring.

3. A compound according to claim 1 wherein the 2-position carbon atom of the dioxolane ring is a ring carbon atom of the cyclic structure.

4. A compound according to claim 1 wherein the piperidine ring is attached by the 2-position carbon atom thereof to the dioxolane ring.

5. A compound according to claim 1 wherein other than 2-position carbon atom of the dioxolane ring, the ring carbon atoms of the dioxolane and piperidine rings are unsubstituted.

6. A 1,3-dioxolane having at the 4-position, as its sole substituent other than at the 2-position, an unsubstituted piperidine ring bonded directly thereto by the 2-position ring carbon atom of the piperidine ring and at the 2-position a non-acidic, non-basic, non-nitrogenous neutral cyclic structure having a molecular weight less than 300 and containing from 1 to 3 benzene rings of which all are in carbon-to-carbon linkage with and separated by no more than one carbon atom from the 2-position carbon atom of the dioxolane ring.

7. A compound according to claim 6 wherein the cyclic structure is hydrocarbon.

8. 2,2 - diphenyl-4-(2-piperidyl)-1,3-dioxolane hydrochloride.

9. The ethanol soluble alpha racemate of the composition of claim 8.

10. (+)2,2-diphenyl-4-(2-piperidyl)-1,3-dioxolane optical isomer of the ethanol soluble alpha racemate hydrochloride, substantially free from the (−) optical isomer.

11. (−)2,2-diphenyl-4-(2-piperidyl)-1,3-dioxolone optical isomer of the ethanol soluble alpha racemate hydrochloride, substantially free from the (+) optical isomer.

12. 2 - ethyl-2-phenyl-4-(2-piperidyl)-1,3-dioxolane hydrochloride alpha racemate.

13. 4-(1-benzyl-2-piperidyl)-2,2-diphenyl-1,3-dioxolane hydrochloride alpha racemate.

14. (+) - 4-(1-benzyl-2-piperidyl)-2,2-diphenyl-1,3-dioxolane hydrochloride alpha racemate.

15. 2,2 - diphenyl-4-(4-piperidyl)-1,3-dioxolane hydrochloride.

16. 4 - (1-methyl-4-piperidyl)-2,2-diphenyl-1,3-dioxolane hydrochloride.

17. (+) - 4 - (1-methyl-2-piperidyl)-2,2-diphenyl-1,3-dioxolane hydrochloride.

18. 4 - (1-methyl-2-piperidyl)-2,2-diphenyl-1,3-dioxolane N-oxide hydrochloride beta racemate.

19. (+) - 4-(1-allyl-2-piperidyl)-2,2-diphenyl-1,3-dioxolane hydrochloride alpha racemate.

20. 2,2-dialkyl-4-piperidyl-1,3-dioxolane wherein each alkyl group contains from 4 to 16 carbon atoms and the piperidyl ring is bonded by a ring carbon atom thereof directly to the 4-position carbon atom of the dioxolane ring.

21. 2,2 - dihexyl-4-(2-piperidyl)-1,3-dioxolane hydrochloride alpha racemate.

22. 2,2 - dioctyl-4-(2-piperidyl)-1,3-dioxolane hydrochloride alpha racemate.

References Cited by the Examiner

UNITED STATES PATENTS

| | | | |
|---|---|---|---|
| 2,606,909 | 8/1952 | Blicke | 260—294.7 |
| 2,830,988 | 4/1958 | Scheffler et al. | 260—294.7 |
| 2,916,493 | 12/1959 | Jacob et al. | 260—294.7 |

WALTER A. MODANCE, *Primary Examiner.*

AVROM D. SPEVACK, *Assistant Examiner.*